(12) United States Patent
McNeely

(10) Patent No.: US 7,292,638 B2
(45) Date of Patent: *Nov. 6, 2007

(54) TRANSFORM-BASED ALIAS CANCELLATION MULTI-CHANNEL TUNER

(75) Inventor: David Lowell McNeely, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 501 days.

This patent is subject to a terminal disclaimer.

(21) Appl. No.: 10/428,973

(22) Filed: May 2, 2003

(65) Prior Publication Data

US 2004/0218681 A1 Nov. 4, 2004

(51) Int. Cl.
 *H04K 1/10* (2006.01)
 *H04L 27/28* (2006.01)
(52) U.S. Cl. .............. 375/260; 375/340; 375/324; 455/13.1; 455/12.1
(58) Field of Classification Search ............ 375/260, 375/340, 324, 316; 370/208; 455/12.1, 455/13.1
See application file for complete search history.

(56) References Cited

U.S. PATENT DOCUMENTS

| 5,278,837 A | 1/1994 | Kelley |
| 5,629,736 A | 5/1997 | Haskell |
| 5,684,829 A | 11/1997 | Kizuki |
| 5,870,402 A | 2/1999 | Kelley |
| 6,449,244 B1 * | 9/2002 | Loseke ............... 370/208 |
| 6,473,409 B1 | 10/2002 | Malvar |

OTHER PUBLICATIONS

Tretter, "Introduction to Discrete-Time Signal Processing", 1976, published by John Wiley & Son, Inc., p. 284.*
Haykin, "An Introduction to Analog and Digital Communications", 1989, published by John Wiley & Son, Inc., pp. 66-71.*

* cited by examiner

*Primary Examiner*—Phuong Phu
(74) *Attorney, Agent, or Firm*—Joseph J. Laks; Ronald H. Kurdyla; Joseph J. Opalach

(57) ABSTRACT

A satellite receiver includes a signal cancellation tuner for processing a plurality of different transponder signals to simultaneously provide a plurality of different bit streams. The signal cancellation tuner includes (a) a demultiplexer for demultiplexing a received signal representing the plurality of transponder signals into a number of decimated signals, each transponder signal conveying a bit stream, and (b) a transform element operative on the number of decimated signals for providing at least two of the bitstreams simultaneously.

28 Claims, 23 Drawing Sheets

Stage 2

FIG. 19

Stage 3

$$\text{Stage 3} = \begin{bmatrix} \text{Stage 3 Out 1} \\ \text{Stage 3 Out 2} \\ \text{Stage 3 Out 3} \\ \text{Stage 3 Out 4} \\ \text{Stage 3 Out 5} \\ \text{Stage 3 Out 6} \\ \text{Stage 3 Out 7} \\ \text{Stage 3 Out 8} \\ \text{Stage 3 Out 9} \\ \text{Stage 3 Out 10} \\ \text{Stage 3 Out 11} \\ \text{Stage 3 Out 12} \\ \text{Stage 3 Out 13} \\ \text{Stage 3 Out 14} \\ \text{Stage 3 Out 15} \\ \text{Stage 3 Out 16} \end{bmatrix} = \underset{13 \times 13}{\begin{bmatrix} 1 & 0 & 0 & 0 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 \\ 0 & 0 & 0 & 0 & 0 & 0 & 0 & 1 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 0 & 0 & 0 & 1 \\ 0 & 0 & 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 1 & 0 & 0 & 0 & 0 & 0 & 0 \\ 0 & 0 & 0 & 0 & 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 0 & 1 & 0 & 0 & 0 & 0 \end{bmatrix}} \cdot \begin{bmatrix} R\left(\frac{3\pi}{4}\right) & & \\ & 0 & \\ & & R\left(\frac{15\pi}{8}\right) \\ & 0 & \\ & & R\left(\frac{11\pi}{8}\right) \end{bmatrix}_{13 \times 13} \cdot \begin{bmatrix} \text{Stage 2 Out 1} \\ \text{Stage 2 Out 2} \\ \text{Stage 2 Out 3} \\ \text{Stage 2 Out 4} \\ \text{Stage 2 Out 5} \\ \text{Stage 2 Out 6} \\ \text{Stage 2 Out 7} \\ \text{Stage 2 Out 8} \\ \text{Stage 2 Out 9} \\ \text{Stage 2 Out 10} \\ \text{Stage 2 Out 11} \\ \text{Stage 2 Out 12} \\ \text{Stage 2 Out 13} \\ \text{Stage 2 Out 14} \\ \text{Stage 2 Out 15} \\ \text{Stage 2 Out 16} \end{bmatrix}$$

Stage 5

| Stage 5 Out 1 | | 1 | 0 | 0 | 0 | 0 | 0 | 0 | 0 | 0 | 0 | 0 | 0 | 0 | 0 | 0 | 0 | | Stage 4 Out 1 |
|---|---|---|---|---|---|---|---|---|---|---|---|---|---|---|---|---|---|---|
| Stage 5 Out 2 | | 0 | 0.5-0.5i | 0 | 0 | 0 | 0 | 0 | 0 | 0 | 0.5+0.5i | 0 | 0 | 0 | 0 | 0 | 0 | | Stage 4 Out 2 |
| Stage 5 Out 3 | | 0 | 0 | 0.5-0.5i | 0 | 0 | 0 | 0 | 0 | 0 | 0 | 0 | 0.5+0.5i | 0 | 0 | 0 | 0 | | Stage 4 Out 3 |
| Stage 5 Out 4 | | 0 | 0 | 0 | 0.5-0.5i | 0 | 0 | 0 | 0 | 0 | 0 | 0 | 0 | 0.5+0.5i | 0 | 0 | 0 | | Stage 4 Out 4 |
| Stage 5 Out 5 | | 0 | 0 | 0 | 0 | 0.5-0.5i | 0 | 0 | 0 | 0 | 0 | 0 | 0 | 0 | 0.5+0.5i | 0 | 0 | | Stage 4 Out 5 |
| Stage 5 Out 6 | | 0 | 0 | 0 | 0 | 0 | 0.5-0.5i | 0 | 0 | 0 | 0 | 0 | 0 | 0 | 0 | 0.5+0.5i | 0 | | Stage 4 Out 6 |
| Stage 5 Out 7 | | 0 | 0 | 0 | 0 | 0 | 0 | 0.5-0.5i | 0 | 0 | 0 | 0 | 0 | 0 | 0 | 0 | 0.5+0.5i | | Stage 4 Out 7 |
| Stage 5 Out 8 | = | 0 | 0 | 0 | 0 | 0 | 0 | 0 | 0.5-0.5i | 0.5+0.5i | 0 | 0 | 0 | 0 | 0 | 0 | 0 | | Stage 4 Out 8 |
| Stage 5 Out 9 | | 0 | 0 | 0 | 0 | 0 | 0 | 0 | 1 | 0 | 0 | 0 | 0 | 0 | 0 | 0 | 0 | | Stage 4 Out 9 |
| Stage 5 Out 10 | | 0 | 0 | 0 | 0 | 0 | 0 | 0.5+0.5i | 0 | 0 | 0.5-0.5i | 0 | 0 | 0 | 0 | 0 | 0 | | Stage 4 Out 10 |
| Stage 5 Out 11 | | 0 | 0 | 0 | 0 | 0 | 0.5+0.5i | 0 | 0 | 0 | 0 | 0.5-0.5i | 0 | 0 | 0 | 0 | 0 | | Stage 4 Out 11 |
| Stage 5 Out 12 | | 0 | 0 | 0 | 0 | 0.5+0.5i | 0 | 0 | 0 | 0 | 0 | 0 | 0.5-0.5i | 0 | 0 | 0 | 0 | | Stage 4 Out 12 |
| Stage 5 Out 13 | | 0 | 0 | 0 | 0.5+0.5i | 0 | 0 | 0 | 0 | 0 | 0 | 0 | 0 | 0.5-0.5i | 0 | 0 | 0 | | Stage 4 Out 13 |
| Stage 5 Out 14 | | 0 | 0 | 0.5+0.5i | 0 | 0 | 0 | 0 | 0 | 0 | 0 | 0 | 0 | 0 | 0.5-0.5i | 0 | 0 | | Stage 4 Out 14 |
| Stage 5 Out 15 | | 0 | 0.5+0.5i | 0 | 0 | 0 | 0 | 0 | 0 | 0 | 0 | 0 | 0 | 0 | 0 | 0.5-0.5i | 0 | | Stage 4 Out 15 |
| Stage 5 Out 16 | | 0 | 0.5+0.5i | 0 | 0 | 0 | 0 | 0 | 0 | 0 | 0 | 0 | 0 | 0 | 0 | 0 | 0.5-0.5i | | Stage 4 Out 16 |

FIG. 22

$$\text{Stage 6} \begin{bmatrix} \text{Channel } 0 \\ \text{Channel } \overline{1/2} \\ \text{Channel } \overline{3/4} \\ \text{Channel } \overline{5/6} \\ \text{Channel } \overline{7/8} \\ \text{Channel } \overline{9/10} \\ \text{Channel } \overline{11/12} \\ \text{Channel } \overline{13/14} \\ \text{Channel } \overline{15} \\ \text{Channel } \overline{13/14} \\ \text{Channel } \overline{11/12} \\ \text{Channel } \overline{9/10} \\ \text{Channel } \overline{7/8} \\ \text{Channel } \overline{5/6} \\ \text{Channel } \overline{3/4} \\ \text{Channel } \overline{1/2} \end{bmatrix} = \begin{bmatrix} 1 & 0 & 0 & 0 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 0 & 0 & 0 & 0 & 0 & 0 & 0 & 1 & 0 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 0 & 0 & 0 & 0 & 1 & 0 \\ 0 & 0 & 0 & 0 & 0 & 0 & 0 & 0 & 0 & 1 & 0 & 0 & 0 & 0 & 0 & 0 \\ 0 & 0 & 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 0 & 0 & 0 & 0 & 1 \end{bmatrix} \cdot \begin{bmatrix} \text{Stage 5 Out 1} \\ \text{Stage 5 Out 2} \\ \text{Stage 5 Out 3} \\ \text{Stage 5 Out 4} \\ \text{Stage 5 Out 5} \\ \text{Stage 5 Out 6} \\ \text{Stage 5 Out 7} \\ \text{Stage 5 Out 8} \\ \text{Stage 5 Out 9} \\ \text{Stage 5 Out 10} \\ \text{Stage 5 Out 11} \\ \text{Stage 5 Out 12} \\ \text{Stage 5 Out 13} \\ \text{Stage 5 Out 14} \\ \text{Stage 5 Out 15} \\ \text{Stage 5 Out 16} \end{bmatrix}$$

TRANSFORM-BASED ALIAS CANCELLATION MULTI-CHANNEL TUNER

CROSS-REFERENCE TO RELATED APPLICATIONS

This application is related to International Patent Application PCT/US03/08365 designating the United States, filed Mar. 19, 2003. This application is also related to the copending, commonly assigned U.S. patent application Ser. No. 10/428,614, entitled "A Multi-channel Tuner using a Discrete Cosine Transform", filed on even date herewith.

BACKGROUND OF THE INVENTION

The present invention generally relates to signal receiving devices, and more particularly, to a multi-channel satellite signal receiver.

A conventional satellite receiving device, such as a direct broadcast satellite (DBS) receiver, can tune to any one of a number of satellite transponders, each transponder transmitting a downlink signal in a particular frequency band. The transponder downlink signal typically represents a bit stream in a packet format, the packets conveying data, such as audio, video, programming information, etc., associated with one or more broadcast channels or services. In this regard, each transponder is typically associated with a different set of broadcast channels. As such, a desired sports program may be found on one of the broadcast channels associated with one transponder while a movie may be found on one of the broadcast channels associated with a different transponder.

Unfortunately, as noted above, such a conventional satellite receiving device only tunes to one downlink signal from one transponder at a time. This leads to a number of problems. For example, "channel surfing," i.e., switching from one broadcast channel to another, may entail switching transponders, which causes additional processing delays— delays that slow down the channel surfing process. Further, in households that desire to simultaneously watch, or listen, to programs associated with different transponders—those households must spend more money to purchase, or lease, multiple conventional satellite receiving devices.

SUMMARY OF THE INVENTION

Therefore, and in accordance with the principles of the invention, a receiving device includes a signal cancellation tuner for simultaneously processing a plurality of received signals, each received signal corresponding to a bit stream. The signal cancellation tuner includes a sampler for sampling the plurality of received signals for providing a number of aliased sample streams and a discrete transform element operative on the aliased sample streams to recover at least two of the corresponding bitstreams.

In one embodiment of the invention, the receiving device is a satellite receiver. The satellite receiver comprises a signal cancellation tuner that includes (a) a demultiplexer for demultiplexing a received signal representing a plurality of transponder signals into a number of decimated signals, each transponder signal conveying a bit stream, and (b) a transform element operative on the number of decimated signals for providing at least two of the bitstreams.

In another embodiment of the invention, an integrated circuit includes a transform element for receiving a plurality of decimated signals, the transform element operative on the received plurality of decimated signals to provide at least two bit streams, each bit stream associated with a different transmission frequency band. Illustratively, each frequency band is associated with a different transponder of a satellite cable distribution network.

In another embodiment of the invention, the receiving device is a satellite receiver. The satellite receiver performs a signal cancellation method that includes (a) demultiplexing a received signal representing a plurality of transponder signals into a number of decimated signals, each transponder signal conveying a bit stream, and (b) transforming the number of decimated signals for providing at least two of the bitstreams.

BRIEF DESCRIPTION OF THE DRAWINGS

FIG. 13 is an illustrative transform matrix for use by transform element 230 of FIG. 12;

Figure 18:
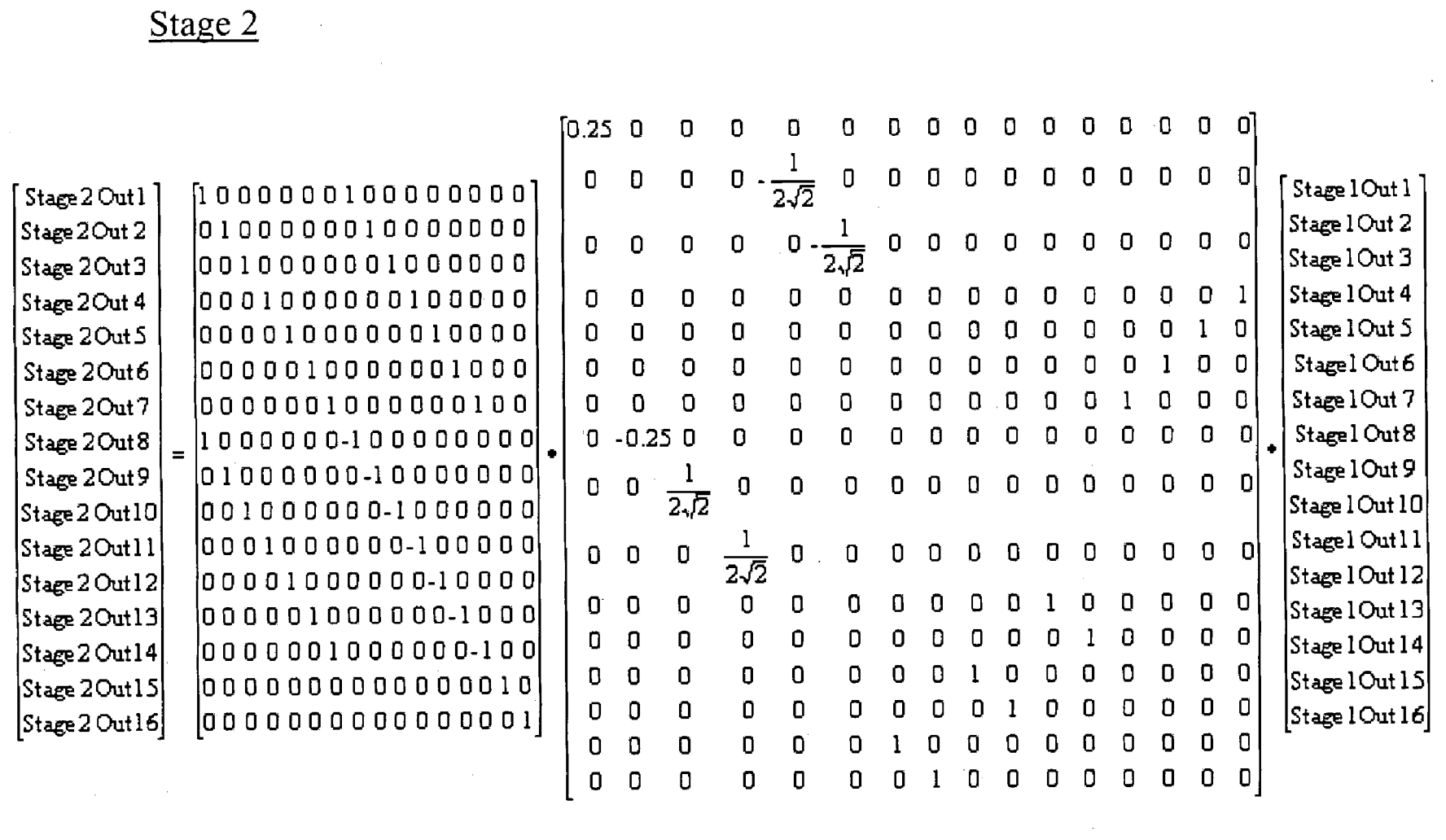
Figure 20:
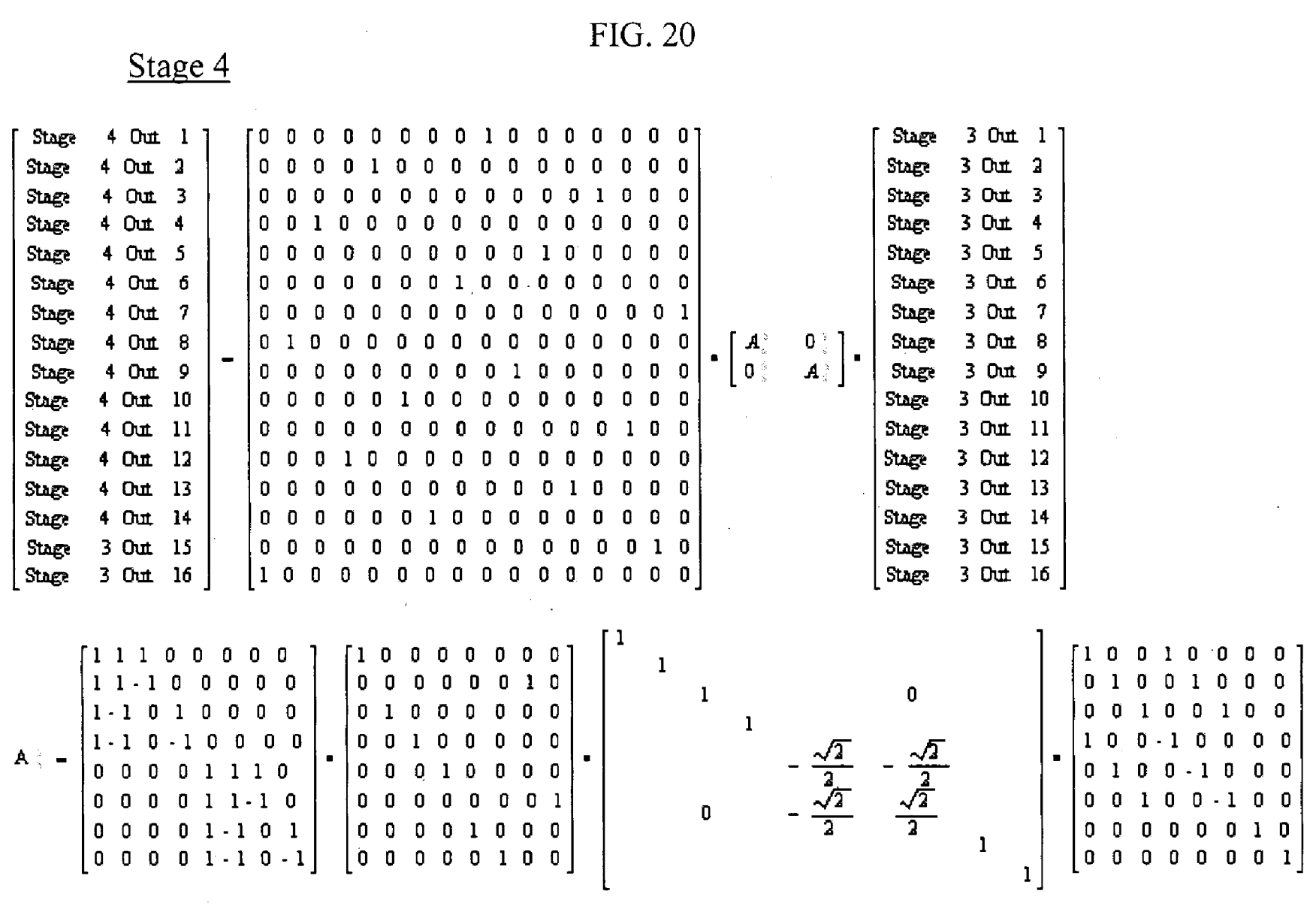

FIGS. 17-22 show another illustrative transform operation in accordance with the principles of the invention.

DETAILED DESCRIPTION

Other than the inventive concept, the elements shown in the figures are well known and will not be described in detail. Also, familiarity with satellite-based program distribution is assumed and is not described in detail herein. For example, other than the inventive concept, satellite transponders, downlink signals, a radio-frequency (rf) front-end, or receiver section, such as a low noise block, and formatting and encoding methods (such as Moving Picture Expert Group (MPEG)-2 Systems Standard (ISO/IEC 13818-1)) for generating transport bit streams are well-known and not described herein. In addition, the inventive concept may be implemented using conventional programming techniques, which, as such, will not be described herein. Finally, like-numbers on the figures represent similar elements.

The inventive concept utilizes sample data theory. In that regard, before describing an illustrative embodiment of the invention, a brief review of sample data theory is provided.

Figure 1:
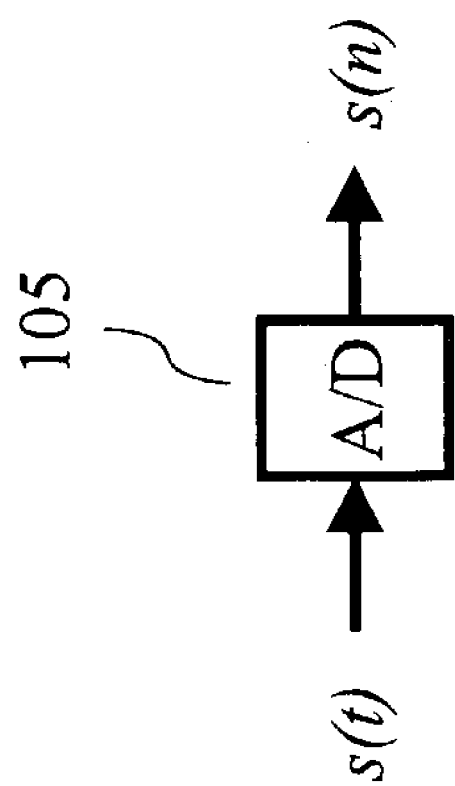
FIGS. 1-3 illustrate sampling data concepts of the prior art.
Figure 2:
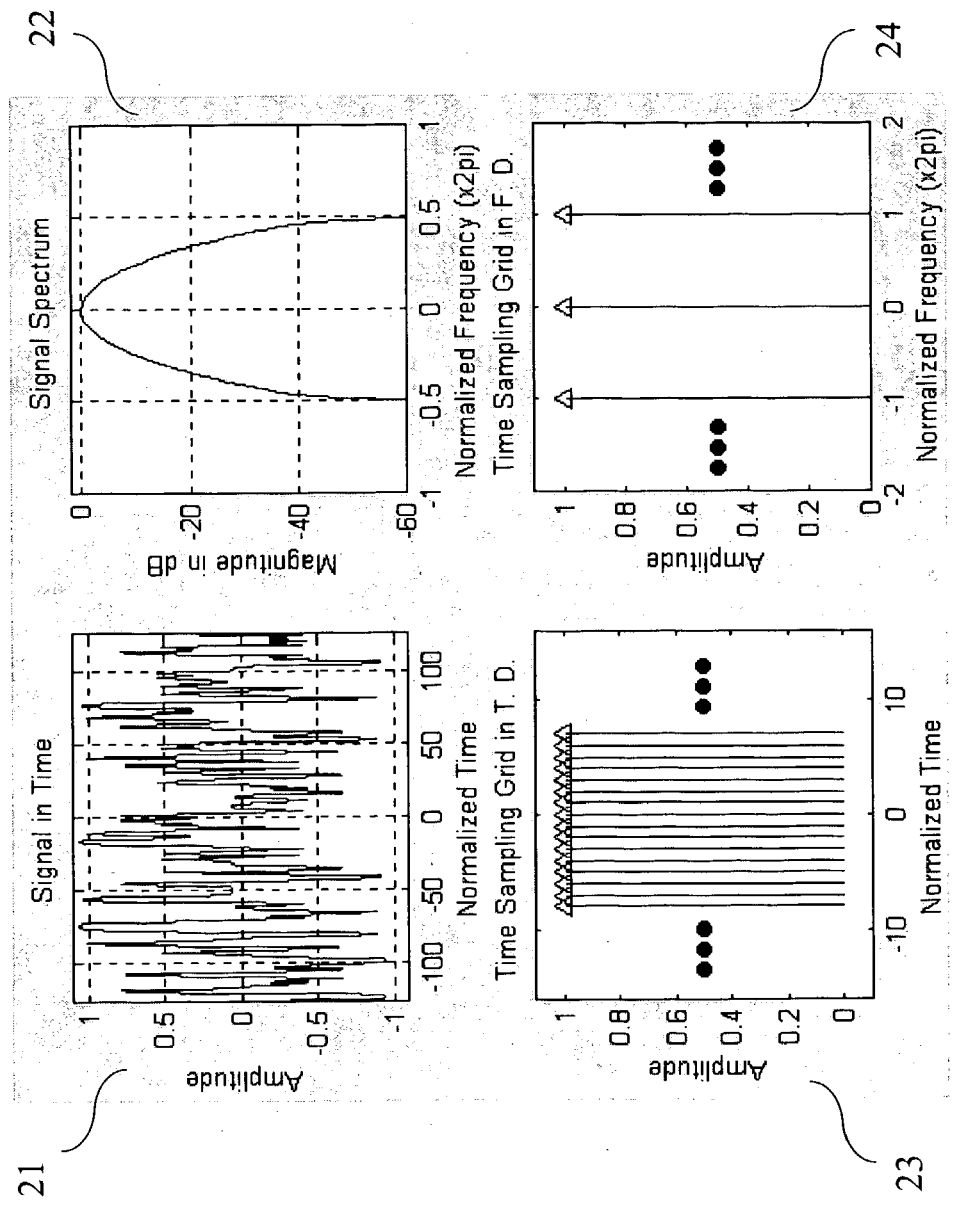

Referring to FIG. 1, an illustrative one-dimensional (1-D) continuous time signal, s(t), is applied to an analog-to-digital converter (A/D) 105, which samples signal s(t) at a sampling rate, r, to provide a sampled signal s(n), which is a stream of samples at the sampling rate, r. Referring now to FIG. 2, a number of illustrative graphs are shown. Graph 21 shows a portion of signal, s(t), over a normalized amplitude axis and a normalized time axis. Signal s(t) has a band-limited frequency spectrum, S(f), as shown in graph 22. Signal s(t) is sampled by a signal, g(t), as represented by the sampling grid illustrated in graph 23. Illustratively, g(t) is modeled as a unit area impulse train:

$$g(t) = \sum_{n=-\infty}^{\infty} \delta(t - n \cdot T), \quad (1)$$

where $\delta(\cdot)$ is the known dirac delta function and T=grid spacing. The frequency domain representation of the sampling grid, g(t), is analytically determined by the known Fourier Transform Integral:

$$G(\omega) = \int_{-\infty}^{\infty} g(t) \cdot \varepsilon^{-j\omega \cdot t} \cdot dt = \int_{-\infty}^{\infty} \left( \sum_{n=-\infty}^{\infty} \delta(t - n \cdot T) \right) \cdot \varepsilon^{-j\omega \cdot t} \cdot dt, \quad (2)$$

$$= \sum_{n=-\infty}^{\infty} \left( \int_{-\infty}^{\infty} \delta(t - n \cdot T) \cdot \varepsilon^{-j\omega \cdot t} \cdot dt \right), \quad (3)$$

$$= \sum_{n=-\infty}^{\infty} \varepsilon^{-j\omega \cdot n \cdot T} = \left( \sum_{n=0}^{\infty} (\varepsilon^{j\omega \cdot T})^n + \varepsilon^{-j\omega \cdot n \cdot T} \cdot \sum_{n=0}^{\infty} (\varepsilon^{-j\omega \cdot T})^n \right). \quad (4)$$

Noting that:

$$\left\{ \frac{1}{1 - X} = \sum_{n=0}^{\infty} x^n, \forall \ x \neq 1 \right\}. \quad (5)$$

then, $G(\omega)$ can be rewritten as:

$$G(\omega) = \frac{1}{1 - \varepsilon^{j\omega \cdot T}} + \frac{\varepsilon^{-j\omega \cdot n \cdot T}}{1 - \varepsilon^{-j\omega \cdot T}}, \text{ or} \quad (6)$$

$$G(\omega) = \begin{cases} \frac{1}{1 - \varepsilon^{j\omega \cdot T}} - \frac{1}{1 - \varepsilon^{j\omega \cdot T}} = 0, & \forall \ \omega \cdot T \neq m \cdot (2\pi) \\ \infty, & \forall \ \omega \cdot T = m \cdot (2\pi) \end{cases} \quad (7)$$

$$= \sum_{n=-\infty}^{\infty} \delta\left(\omega - n \cdot \left(\frac{2\pi}{T}\right)\right).$$

As known in the art, the operation of sampling signal, s(t), on sampling grid, g(t), to obtain a sampled data representation s(n), is modeled as:

$$s(n) = s(t) \cdot g(t) = \sum_{n=-\infty}^{\infty} s(n \cdot T) \cdot \delta(t - n \cdot T). \quad (8)$$

If the time domain impulse spacing is one (1), then the frequency domain impulse spacing is two (2). If the time domain impulse train includes an impulse at time zero (assumed above), then the frequency domain impulse train is real value weighted. If the time domain impulse train is offset from time zero by normalized time units (where normalized spacing equals one), then each impulse in the frequency domain impulse train is weighted by:

$$e^{-j2\pi \cdot n \cdot \alpha}, \quad (9)$$

where n is equal to the normalized frequency index of the impulse train. The normalized frequency spectrum of the impulse train is illustrated in graph 24 of FIG. 2.

Figure 3:
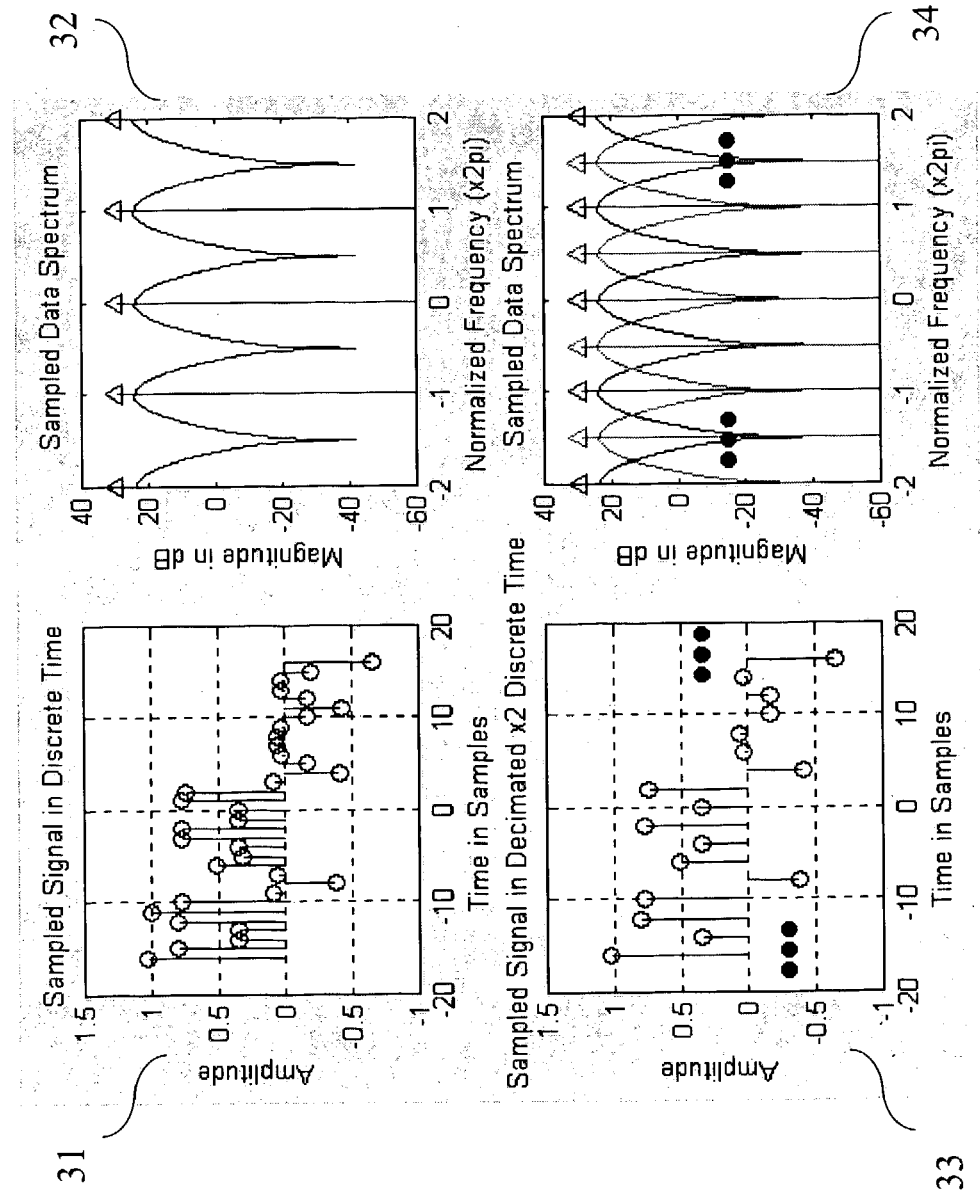

Turning now to FIG. 3, illustrations of the affects of different sampling rates on the sampled data spectrum are shown. Graphs 31 and 32 illustrate the sampling of signal s(t) at the Nyquist rate (i.e., at a rate equal to at least twice the bandwidth of s(t)). Graph 31 illustrates the resulting sampled signal, s(n), in discrete time, while graph 32 illustrates the frequency ambiguity of this sampling. As can be observed from graph 32, the image about the zero frequency is an un-aliased copy of the signal, s(t). In other words, the various copies of the frequency spectrum of s(t) shown in graph 32 are distinct, i.e., un-aliased.

In comparison, graphs 33 and 34 illustrate sampling of signal s(t) at less than the Nyquist rate. Graph 33 illustrates the sampling of signal s(t) at a rate equal to the bandwidth of s(t). Graph 34 illustrates the frequency spectrum of the sampled signal, s(n). It can be observed from graph 34 that images of the signal s(t) now overlap and contaminate the copy of the signal s(t) about the zero frequency. In other words, the frequency copies, or images, are now aliased over one another. All sampling phases yield this result, but, and in accordance with the principles of the invention, the phase of each complex valued image in graph 34 is a function of the sampling phase, as described further below.

Thus, and in accordance with the principles of the invention, a new tuning paradigm is provided based on the basic sampling theory concept of frequency alias and alias cancellation rather then the common tuning method of selecting a channel by filtering out undesired channels. The general concept is to convert a multi-channel signal, s(t), to the digital domain at a sampling rate greater than, or equal to, the Nyquist rate, $F_{Nyquist}$, for s(t) (hereafter referred to as the multi-channel Nyquist rate $F_{M-Nyquist}$), and then subject the resulting data stream, s(n), to a demultiplexing operation to provide a number, N, of output data streams, $s_i(n)$., where $1 \leq i \leq N$. The operation of the demultiplexer is, in effect, a further sampling of the resulting data stream, s(n), at a sampling frequency $F_{M-Nyquist}/N$. Each of the output data streams $s_i(n)$ from the demultiplexer is a decimated stream that is aliased with images of all channels but now at a convenient rate for digital signal processing. Once present, an aliased component cannot be separated from an un-aliased component occupying the same frequency band by a filtering process. However, although each decimated stream has the same alias components—the phasing of these components for each decimation is different and this can be exploited to recover a particular transponder channel un-contaminated from the alias of other channels.

In particular, the demultiplexer has N output data streams, where each output data stream can be viewed as being offset with respect to the other output data streams. For example, let the first output data stream be established as a reference point, then the remaining data streams can be expressed in a phased relationship to this first output data stream. For example, the [(N/2)+1]th output data stream has a phase offset of $\pi$ with respect to the first output data stream assuming that the sample spacing is on a period of $2\pi$.

Figure 4:
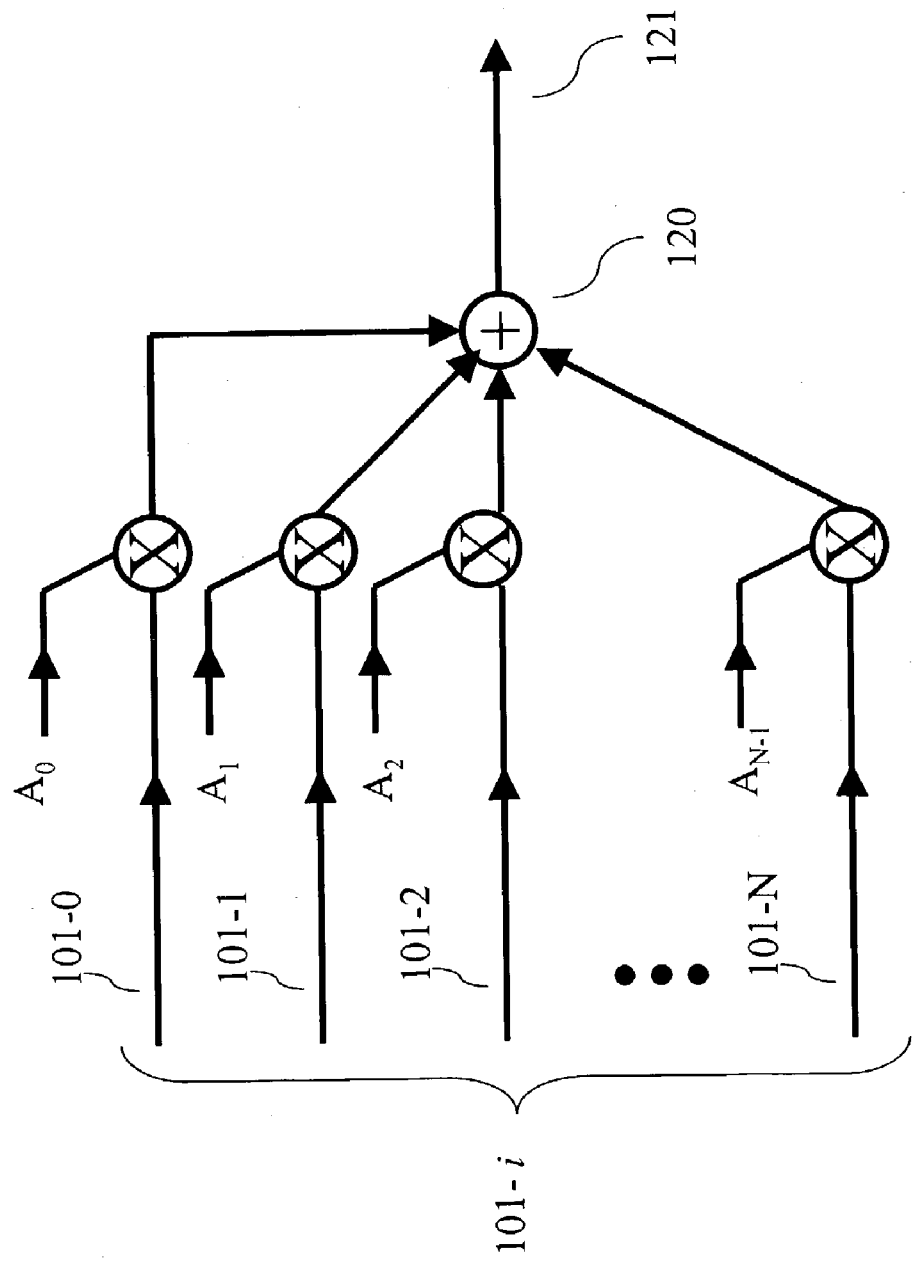
FIG. 4 shows an illustrative recombination of decimated signal streams in accordance with the principles of the invention.

Therefore, to recover a particular transponder channel, each of the output data streams, or decimated streams, are first recombined using a weighting vector, $\alpha_n$, associated with each transponder channel, where $0 \leq n \leq (N-1)$. The weighting vector, $\alpha_n$, has N components and is equal to:

$$\alpha_n = \{A_0, \ldots, A_i, \ldots, A_{N-1}\}, \text{ where} \quad (10a)$$

$$A_i = \exp\left(\frac{j2\pi n i}{N}\right), \quad (10b)$$

where, $0 \leq i \leq N-1$, and i is a particular one of the N decimated streams. For example, to tune to frequency channel 0, the weighting vector $\neq_0$ must be calculated. In this regard, the value of n is set equal to 0 in equation (10b) above. It should be noted that n is associated with Nyquist regions (e.g., see FIG. 9, described below). As such, a predefined mapping may be used to first convert a particular transponder channel to an associated value of n. For a given value of n, different values of $A_i$ result since the value of this weighting factor varies in accordance with the index i. In particular, each of the decimated streams is multiplied by a corresponding factor, $A_i$, of the weighting vector. Continuing the example, to tune to frequency channel 0, samples from the first stream (i.e., that stream associated with an i index value of 0) are multiplied by $A_0$, where equation (10b) has the value of i set equal to zero and the value of n set equal to zero. Likewise, samples from the second stream are multiplied by $A_1$, where equation (10b) has the value of i set equal to one and the value of n set equal to zero. After the weighting of each of the individual decimated streams, the weighted streams are then combined. This is further illustrated in FIG. 4, which shows a recombiner for recombining a number of decimated streams, i, for a particular transponder channel. In particular a number of decimated streams 101-i are applied to a set of multipliers. Each multiplier multiplies a corresponding factor of the weighting vector $\alpha_n$ for a particular transponder channel with a sample value from a corresponding one of the decimated streams. The resulting weighted values are then added together by adder 120 to develop signal 121. As can be observed from above, a number of recombiners, e.g., N, are required for use in recovering each of the transponder channels.

Figure 5:
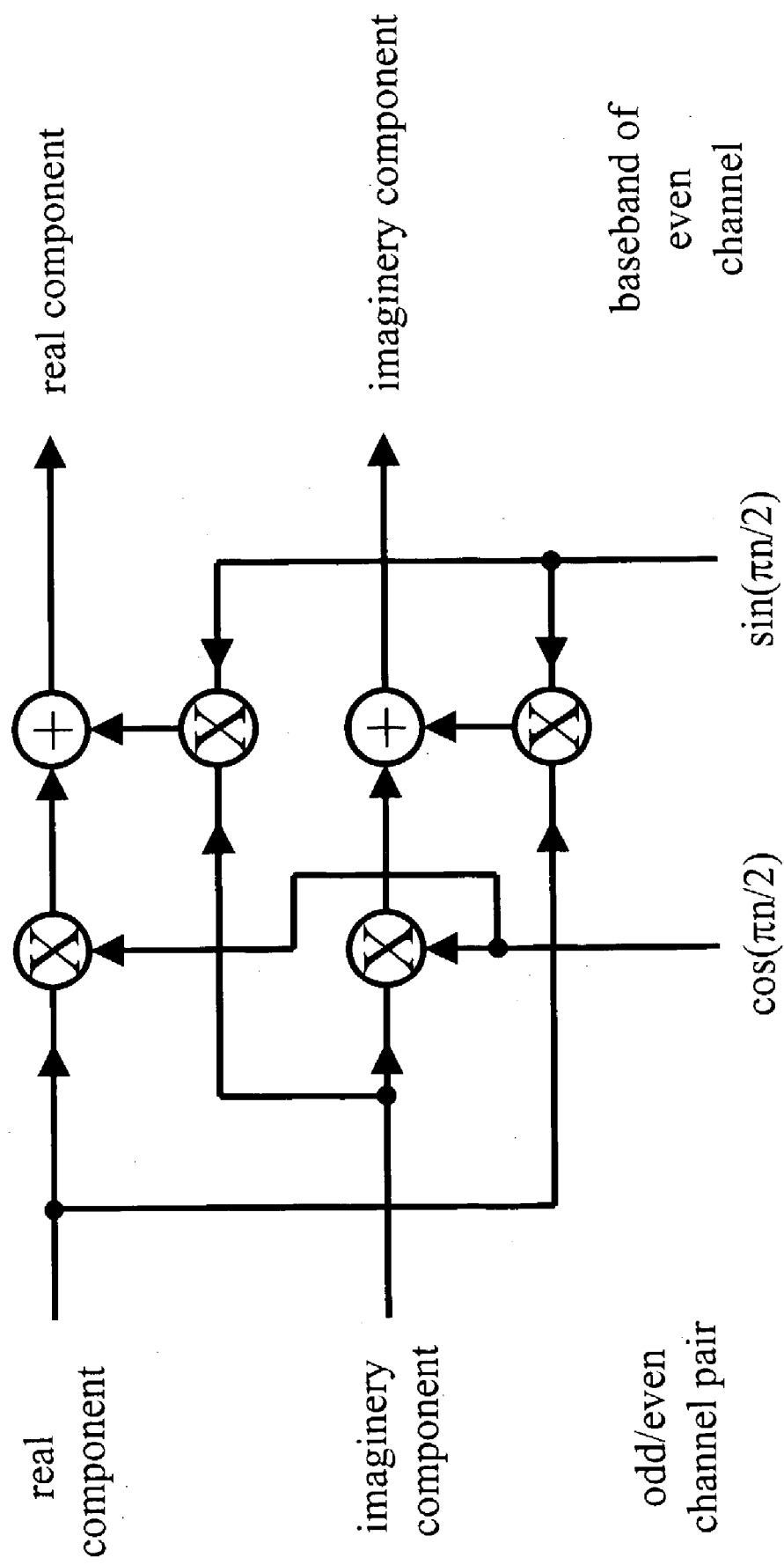
FIGS. 5 and 6 show illustrative channel rejectors in accordance with the principles of the invention.
Figure 6:
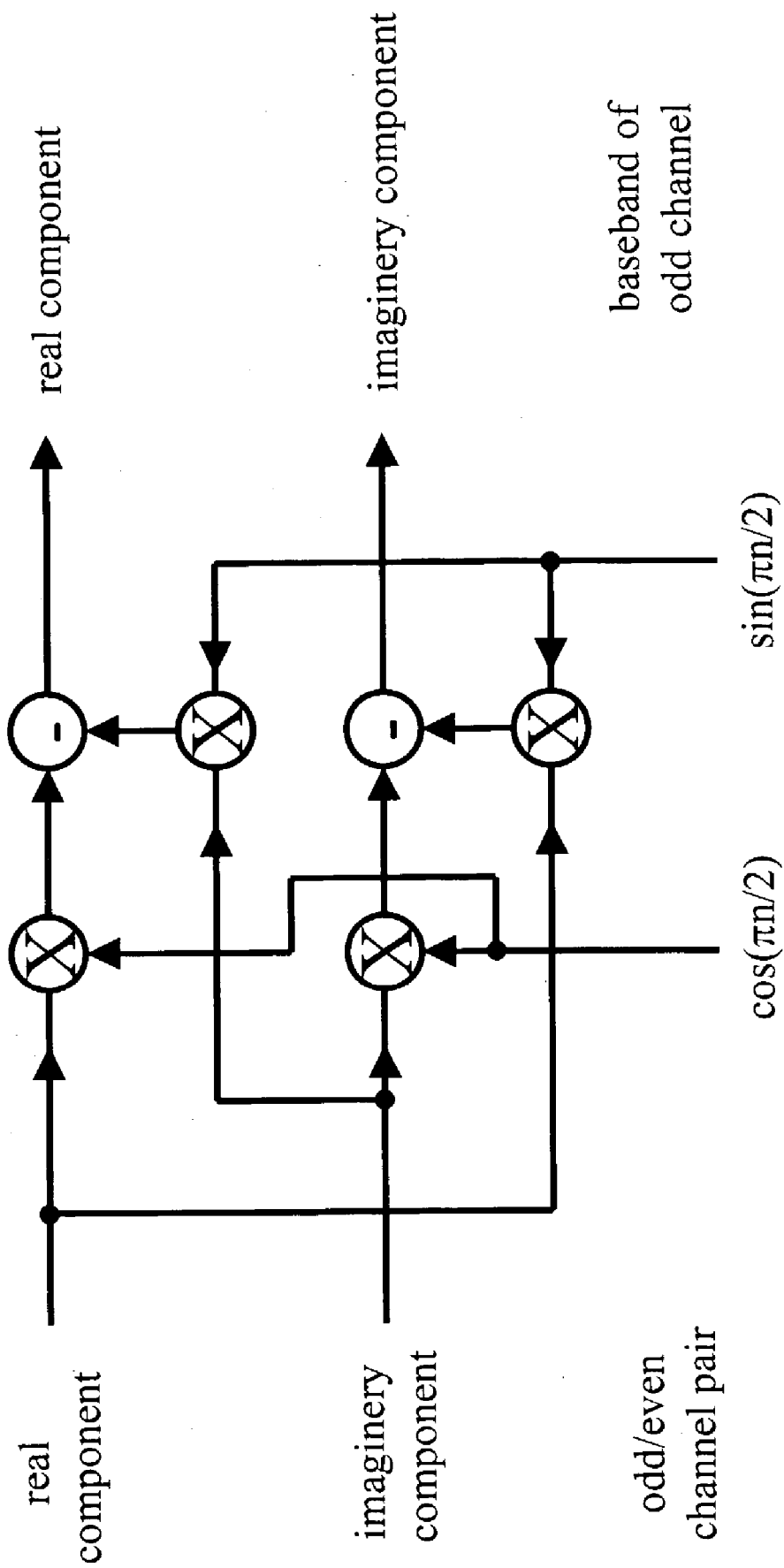

It should be noted that signal 121 may contain two channels (an odd and even channel pair) co-occupying one frequency channel (described below). As such, further processing must be performed to recover a single transponder channel. Such co-occupying frequency channels, when they occur, are separable by phase relationships using the channel rejector of FIGS. 5 and 6. This phase relationship can be exploited by multiplying by:

$$\exp\left(\pm\frac{j\pi m}{2}\right), \quad (11)$$

where m is the sample index (i.e., m is an incrementing integer, e.g., m=0 at the first sample, m=1 at the second sample, m=3 at the third sample, etc.), and the "+" sign is used for tuning to even channels while the "−" sign is used for tuning to odd channels. Rejection of the undesired odd numbered channel of the pair may be performed using the channel rejector of FIG. 5, thus yielding the even frequency channel. Similarly, rejection of the even numbered channel of the superimposed pair can be obtained by changing the adders in FIG. 5 into subtractors as shown in FIG. 6, thus yielding the odd frequency channel. In this example, for those signals containing pairs of channels, resolution of a single channel was performed after recombination. The channel rejectors shown in FIGS. 5 and 6 serve two functions (a) rejection of a paired channel, and (b) demodulation of a near base band signal to base band. However, a receiver can also be implemented such that equation (11) is performed before the recombination described above.

Figure 7:
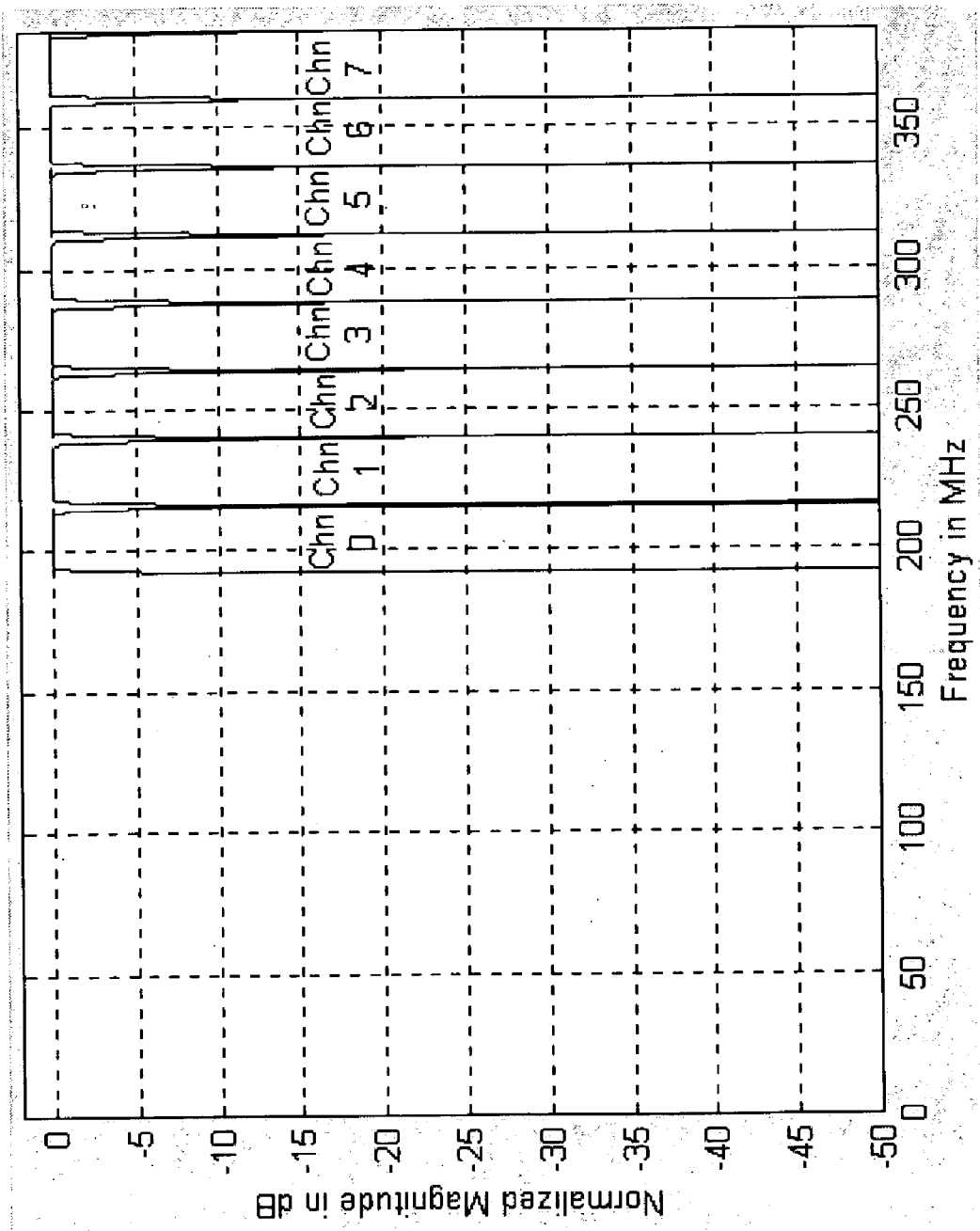
FIG. 7 shows an illustrative frequency spectrum for a received signal representing eight transponder channels.
Figure 8:
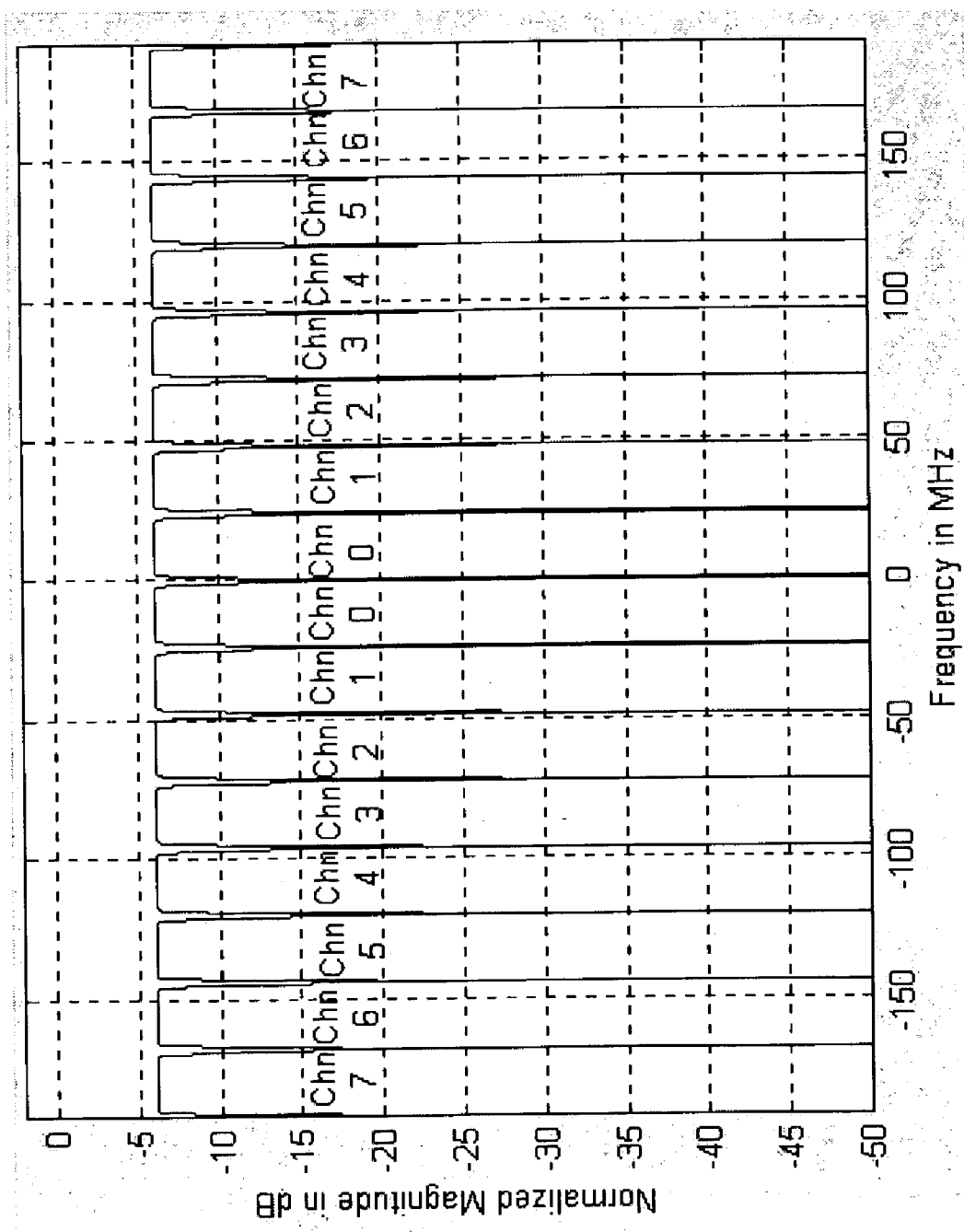
FIG. 8, shows an illustrative frequency spectrum for the received signal of FIG. 4 after sampling at the Nyquist rate.
Figure 9:
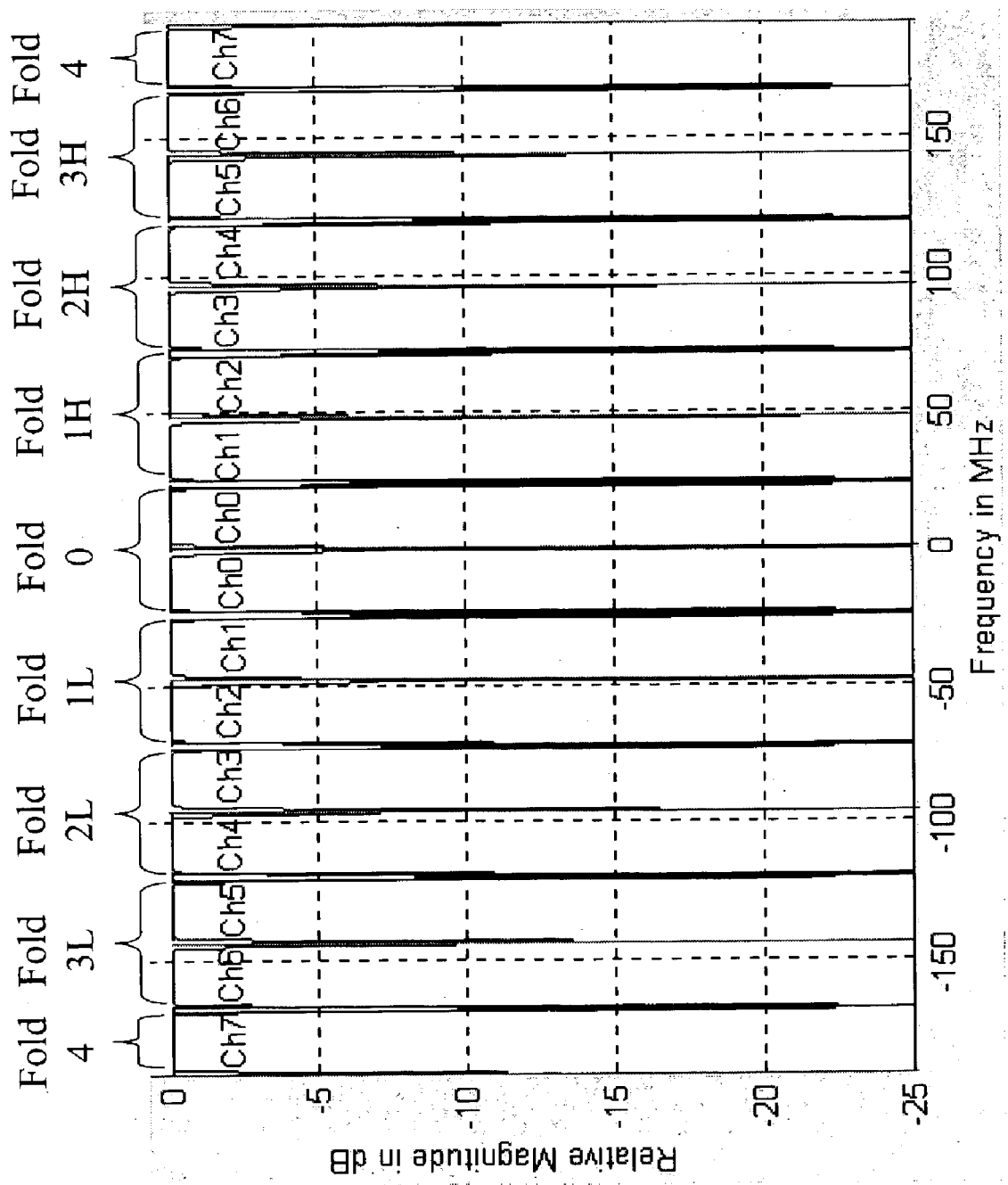
FIG. 9 shows an illustrative frequency spectrum of the sampled received signal after sampling.

The above use of frequency alias and alias cancellation rather then the common tuning method of selecting a channel by filtering out undesired channels is further illustrated with reference to FIGS. 7-9. For example, assume that the multi-channel latent signal s(t) includes eight frequency channels as illustrated in FIG. 7. Illustratively, s(t) represents the downlink transponder signals of a digital broadcasting satellite system (DBS) subsequent to down-shifting, or down-converting, by a low-noise block of a satellite receiver (not shown). These eight frequency channels (Chn 0, ..., Chn 7) each illustratively have a channel bandwidth of 20 MHz. In addition, the spacing between channels, $F_s$, is 24 MHz, as such, the excess bandwidth is 20%. The total bandwidth of s(t) is ((8 channels)(24 MHz/channel))=192 MHz. For the purposes of explanation, it is assumed that the low-noise block converts s(t) to near base band, i.e., 192 MHz maps to zero MHz. As such, the highest frequency component in s(t) is 192 Mhz (not accounting for the excess bandwidth).

The signal s(t) is now sampled at the Multi-channel Nyquist rate, i.e., 384 MHz. The resulting first Multi-channel Nyquist region of the spectrum of the sampled signal s(n) is illustrated in FIG. 8. Now, since there are eight channels, the sampled signal s(n) is decimated into eight 48 Msps (millions of samples per second) streams. This decimation is illustratively accomplished by simply demultiplexing s(n) into eight streams. Each of these streams is heavily aliased with images of all channels but now at a convenient rate for digital signal processing. It should be observed that the demultiplexer sampling rate, also referred to herein as the "post-decimation Nyquist rate," is $2F_s$. In this example, the post-decimation Nyquist rate is 48 MHz. As such, in a single channel, a number of aliased images are now "folded" into the bandwidth of the single channel. In particular, the spectrum shown in FIG. 8 is re-drawn in FIG. 9 to indicate the aliased images before folding. Each of these aliased images are referred to as a fold, of which there are nine folds illustrated in FIG. 9. Fold 0 corresponds to transponder channel zero (Ch0). This fold includes both the positive and negative images of Ch0. Fold 1H corresponds to the positive image of transponder channels one and two (Ch1 and Ch2), and Fold 1L corresponds to the negative image of Ch1 and Ch2. Similarly, the other folds are shown as indicated in FIG. 9. It should be noted that, like Ch0, Fold 4 only represents the positive and negative images of transponder channel 7 (Ch7). Now, the post-decimation Nyquist rate of $2F_s$ not only creates these folds but moves images of each of these folds into the frequency range $-F_s$ to $+F_s$. In other words, each of these nine folds are folded into the two-sided bandwidth of a single channel—here designated as Ch0. It can be observed from FIG. 9, that Fold 0 is completely supported within the post-decimation Nyquist rate of 48 Mhz. As such, subsequent to recombination (described above), the channel rejection function of a channel rejector has no effect and the channel rejector simply demodulates the near base band signal to base band to recover the bit stream associated with Ch0. Similarly, Fold 4 is translated to the frequency range $-F_s$ to $+F_s$ to be completely supported by the post-decimation sampling rate and the demodulation function of the channel rejector provides the bit stream associated with Ch7. However, each of the remaining folds have odd-even channel pairs. As such, the above-described channel rejectors are used to recover the individual transponder channels for those odd-even pairs. For example, Fold 1H is moved down to the frequency range $-F_s$ to $+F_s$ such that Ch1 is in the frequency range $-F_s$ to 0 and Ch2 is in the frequency range 0 to $F_s$. As such, subsequent to recombination, and as described above, a channel rejector is used to reject the negative image of Ch1 in order to recover the bit stream associated with Ch2. Similarly, Fold 1L is moved up to the frequency range $-F_s$ to $+F_s$ such that Ch2 is in the frequency range $-F_s$ to 0 and Ch1 is in the frequency range 0 to Fs. As such, subsequent to recombination, a channel rejector is used to reject the negative image of Ch2 in order to recover the bit stream associated with Ch1.

Figure 10:
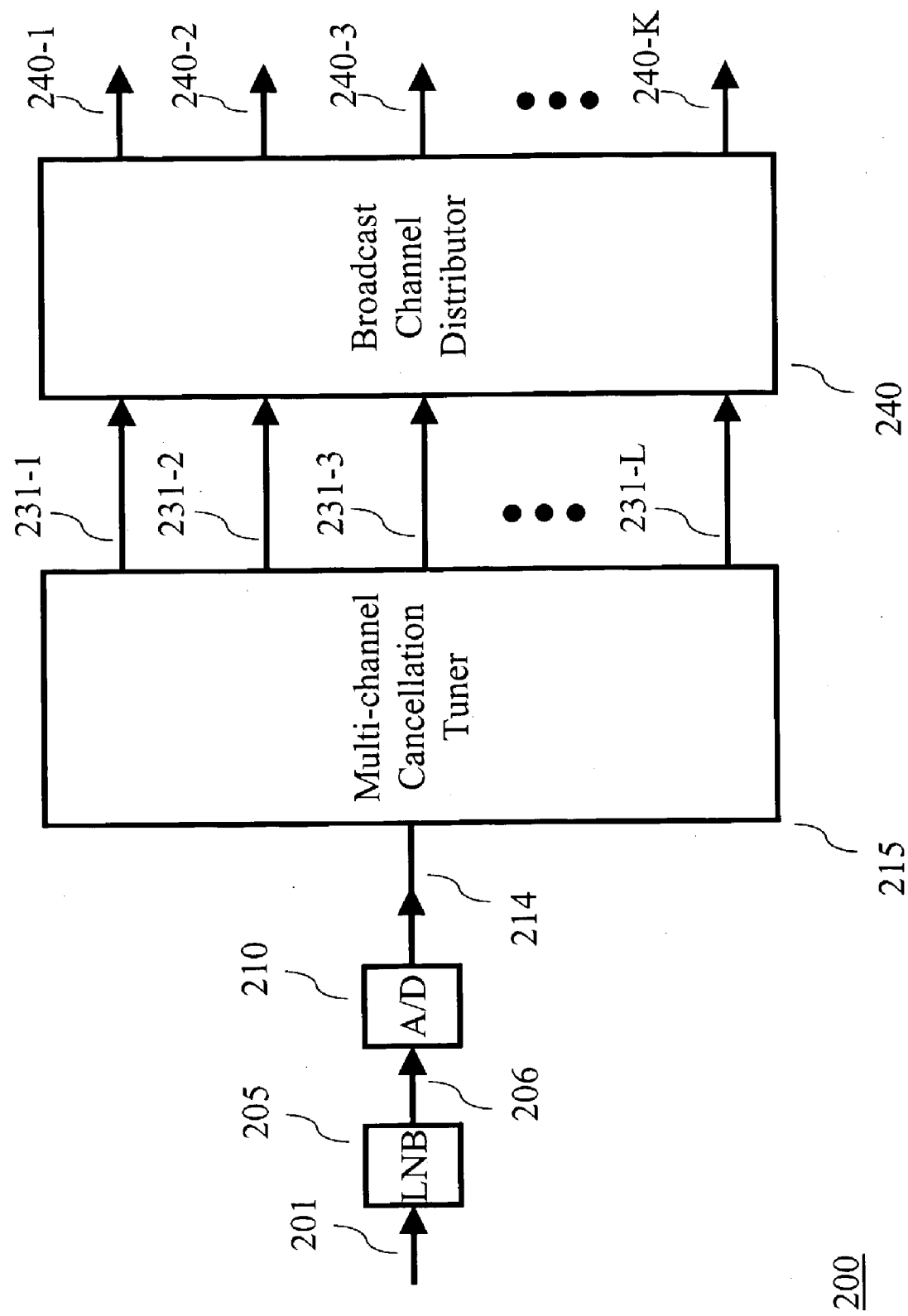
FIG. 10 is an illustrative block-level diagram of a receiver embodying the principles of the invention.

Turning now to FIG. 10, an illustrative receiver 200 in accordance with the principles of the invention is shown. Receiver 200 includes a low noise block (LNB) 205, an analog-to-digital (A/D) converter 210, a multi-channel cancellation tuner 215 and a broadcast channel distributor 240. One or more satellites (not shown) transmit a plurality of downlink radio frequency (RF) signals 201 in different frequency bands (or frequency channels) associated with different transponders at the same polarization. The RF signals 201 may, e.g., be in the frequency range of 17 GHz (giga-hertz). Illustratively, RF signals 201 includes N adjacent frequency channels, whose center frequencies are $F_0$ to $F_{N-1}$, respectively. The channel spacing, $F_s$, is illustratively uniform and equal to the separation between adjacent center frequencies, e.g., $F_s = F_2 - F_1$. As such, the total bandwidth of all frequency bands, $F_{total}$, equals $NF_s$. Each frequency channel contains a modulation on its center frequency (carrier) of bandwidth $F_{bw}$ and has an excess bandwidth of x% and a guard band $F_{gb}$, where $F_{gb} = (F_s - (F_{bw}[(100+x)/100]))$. For purposes of illustration, it is assumed that N=16, $F_s$=29.16 MHz, which is also illustrative of a sixteen transponder digital satellite system (DSS).

It should be noted that the downlink signals may include other properties. For example, the frequency variance of the channel spacing may be essentially zero and/or the symbol timing and carrier offset may be common channel to channel. While these properties may be of use in designing a receiver incorporating the principles of the invention, these properties are not required.

Figure 11:
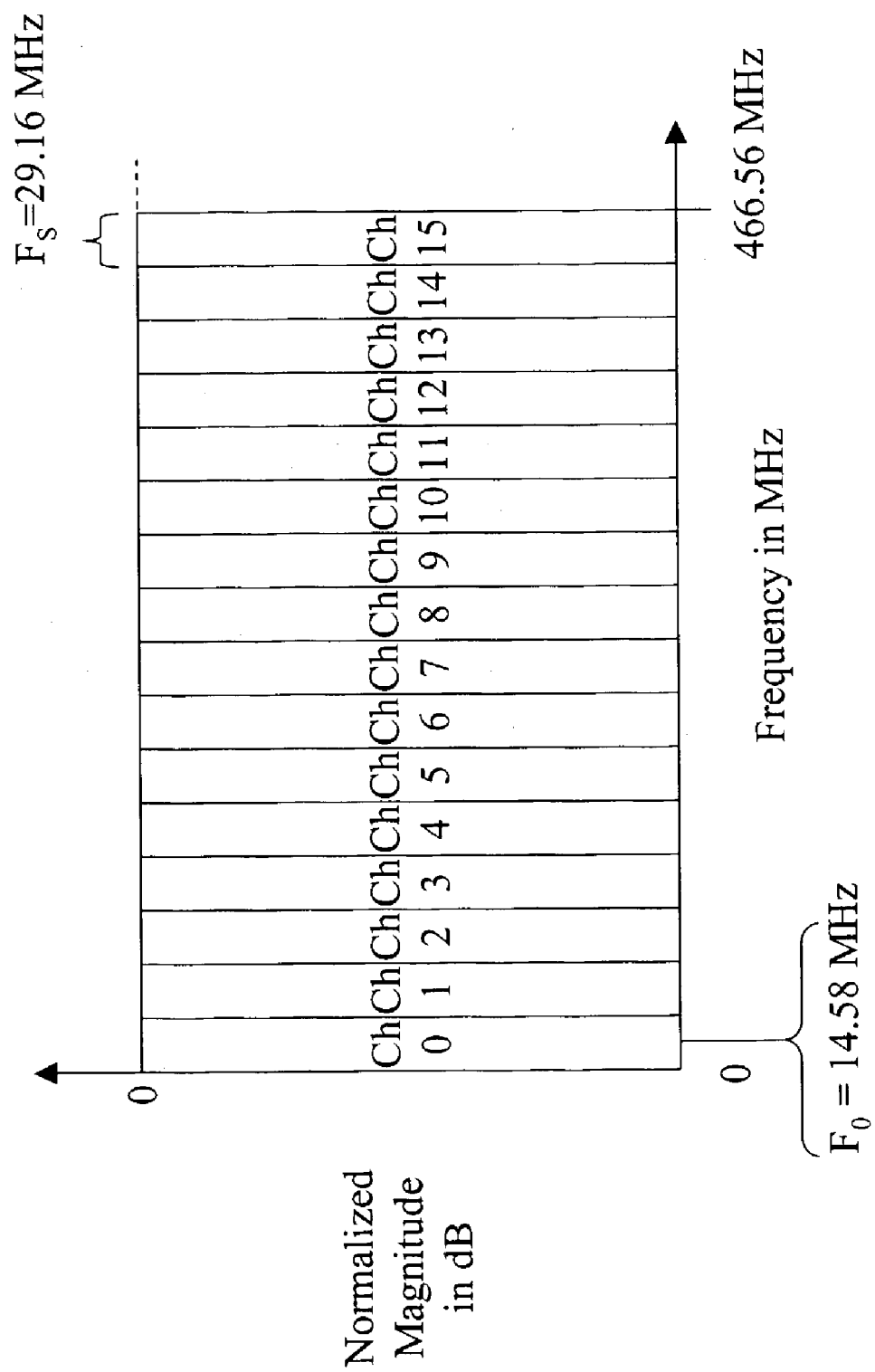
FIG. 11 shows an illustrative frequency spectrum for a received signal representing 16 transponder channels.

The RF signals 201 are received by one or more antennas (not shown) of receiver 200 for application to low noise block (LNB) 205. The latter down shifts and filters the received RF signals 201 and provides a signal 206, which is a near base-band signal having a total bandwidth across all channels of $F_{total}$. For example, the lowest frequency channel (e.g., channel 0) has a carrier $F_0=F_s/2$. This is further illustrated in FIG. 11, which shows the spectrum of the near base-band signal for the 16 DSS channels. Signal 206 is converted from the analog domain to the digital domain via A/D converter 210, which samples signal 206 at a sampling rate, $F_{samp}$, equal to or greater than the Multi-channel Nyquist rate. Illustratively, $F_{samp}=2F_{total}$, i.e., the sampling rate is twice the total bandwidth across all frequency channels, i.e., $F_{samp}=2NF_s$. In this example, $F_{samp}$=933.12 MHz. A/D 210 provides a signal 214, which is a discrete time sequence of samples representing the plurality of transponder channels.

Signal 214 is applied to multi-channel cancellation tuner 215, which, in accordance with the principles of the invention, processes signal 214 to provide a number of simultaneous bit streams from two or more transponder channels as represented by bit streams 231-1 through 231-L, where $1<L\leq N$ (described further below). It should be noted that these simultaneous bit streams are applied to broadcast channel distributor 240, which processes each of the bit streams to provide data associated with virtual channels 240-1 through 240-K, where K>1. For example, broadcast channel distributor 240 decodes each of the bit streams encoded, e.g., in accordance with the earlier-mentioned MPEG-2 Systems Standard ISO/IEC 13818-1. As such, each of these virtual channels represents content and/or services, for example, audio, video (e.g., a selected movie), electronic programming guide etc. As such, it should be realized the although shown as separate signals 240-1 through 240-K, one, or more, of these signals may be multiplexed together for transmission on a broadcast medium, e.g., a cable, or via wireless (such as Wi-Fi (Wireless Fidelity)). For simplicity, other input signals to broadcast channel distributor 240 specifying selection of content and/or services has not been shown. Likewise, other circuitry for delivering the content/services, which may, or may not, be a part of receiver 200 also not been shown.

Figure 12:
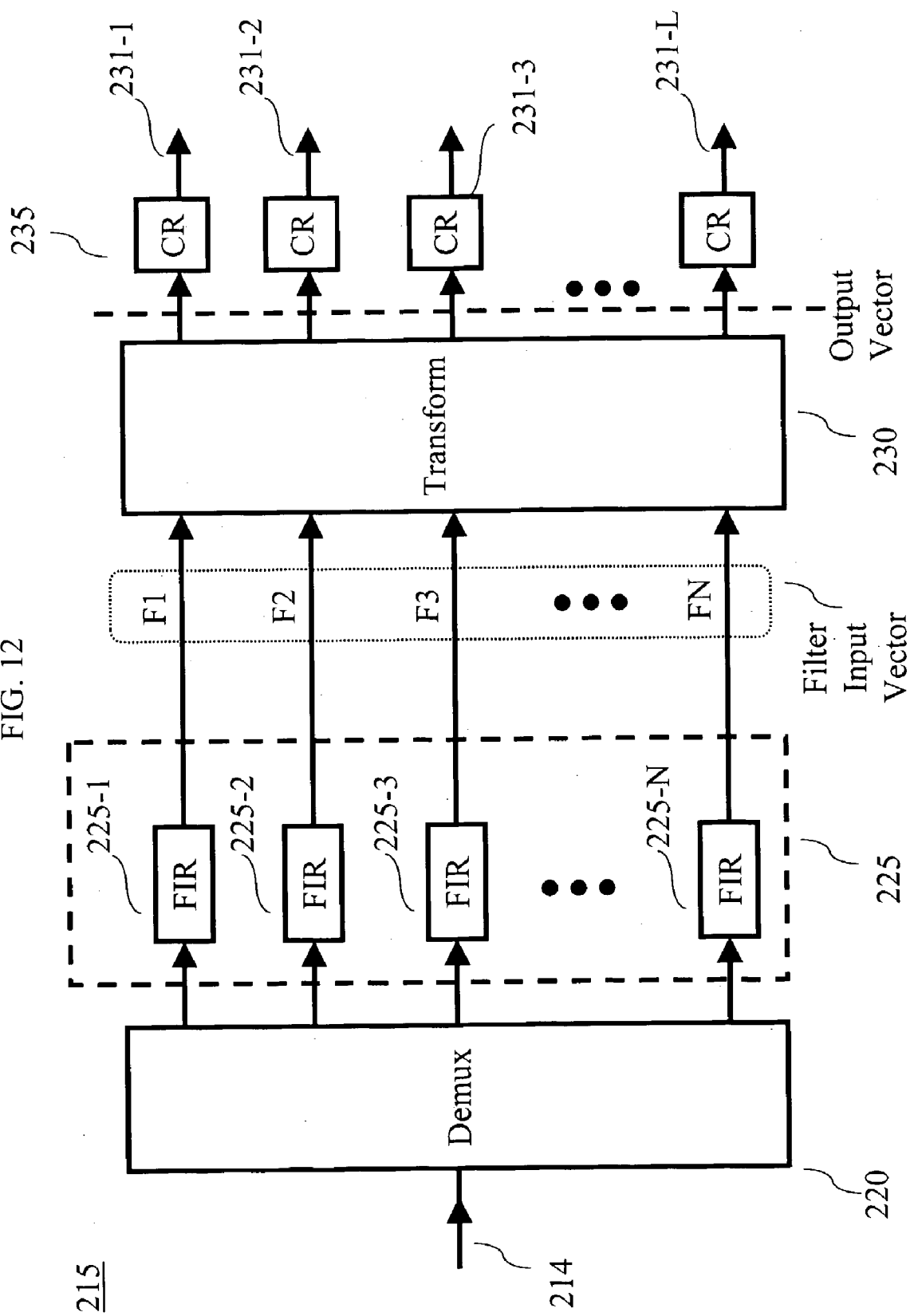
FIG. 12 is an illustrative block-level diagram of a multi-cancellation tuner embodying the principles of the invention.

Turning now to FIG. 12, an illustrative embodiment in accordance with the principles of the invention for multi-channel cancellation tuner 215 is shown. Multi-channel cancellation tuner 215 includes demultiplexer (demux) 220, filter bank 225, which includes finite impulse response (FIR) filters 225-1 through 225-N, transform element 230 and channel rejectors 235. Demux 220 samples signal 214 at a sampling rate, $F_F$, (or post-decimation sampling rate) to provide a number of decimated sample streams to filter bank 225. Illustratively, in this example, the sampling rate, $F_F$, of demux 220 is one $N^{th}$ of the Nyquist rate $2NF_s$, i.e., $F_F = 2F_s$, where N is the number of channels. As noted above, each of these decimated sample streams is aliased with images of all the transponder channels. Since demux 220 is sampling signal 214, the various decimated sample streams provided by demux 220 are shifted in time, i.e., demux 220 introduces a time offset, $T_F$, where $T_F=1/F_F$. As such, filter bank 225 applies differential delays to the decimated sample streams provided from demux 220 to time-align the decimated samples such that transform element 230 processes N decimated samples at the same time. For example, the FIR 225-1 provides the most differential delay to its received sample stream. As such, FIR 225-1 applies a delay of $(N-1)T_F$ (referenced to a zero differential delay of FIR 225-N) to its received sample stream. Similarly, FIR 225-2 applies a differential delay of $(N-2)T_F$ to its received sample stream, and the $N^{th}$ filter, i.e., FIR 225-N, applies no differential delay to its received sample stream. In this manner, the resulting sample streams provided by filter bank 225 are time-aligned for processing by transform element 230. In other words, at a particular time, $t_p$, a filter input vector is formed for application to transform element 230. This filter input vector includes one sample from each of the decimated sample streams at a particular sampling time. The filter input vector comprises samples F1 through FN as illustrated in FIG. 12. Illustratively, the bandwidth of each filter is $2F_s$.

The filter input vector is applied to transform element 230. The latter performs a transform operation for each particular decimated sample stream. That is, $$O_c = HF, \qquad (12)$$

where H is a transform matrix (described below), F is the filter input vector and $O_c$ is an output vector, the elements of which represents each of the N transponder channels. In this regard, H can be any transform matrix that cancels the alias representing undesired transponder channels and re-enforces those components corresponding to the desired transponder channel without requiring the use of a numerous recombiners as described above.

However, and in accordance with an aspect of the invention, transform element 230 addresses tradeoffs with respect to (a) the number of operations; (b) the minimum operations per unit time and (c) the amount of complex mathematics (real and imaginary components) that are performed by transform element 230 in canceling the alias representing undesired transponder channels and re-enforcing those component corresponding to the desired transponder channel. As such, the transform matrix H comprises a number of matrices to address the above-mentioned tradeoffs, as illustrated in the equation below:

$$H=H_1H_2H_3H_4H_5H_6H_7H_8. \quad (13)$$

Figure 13:
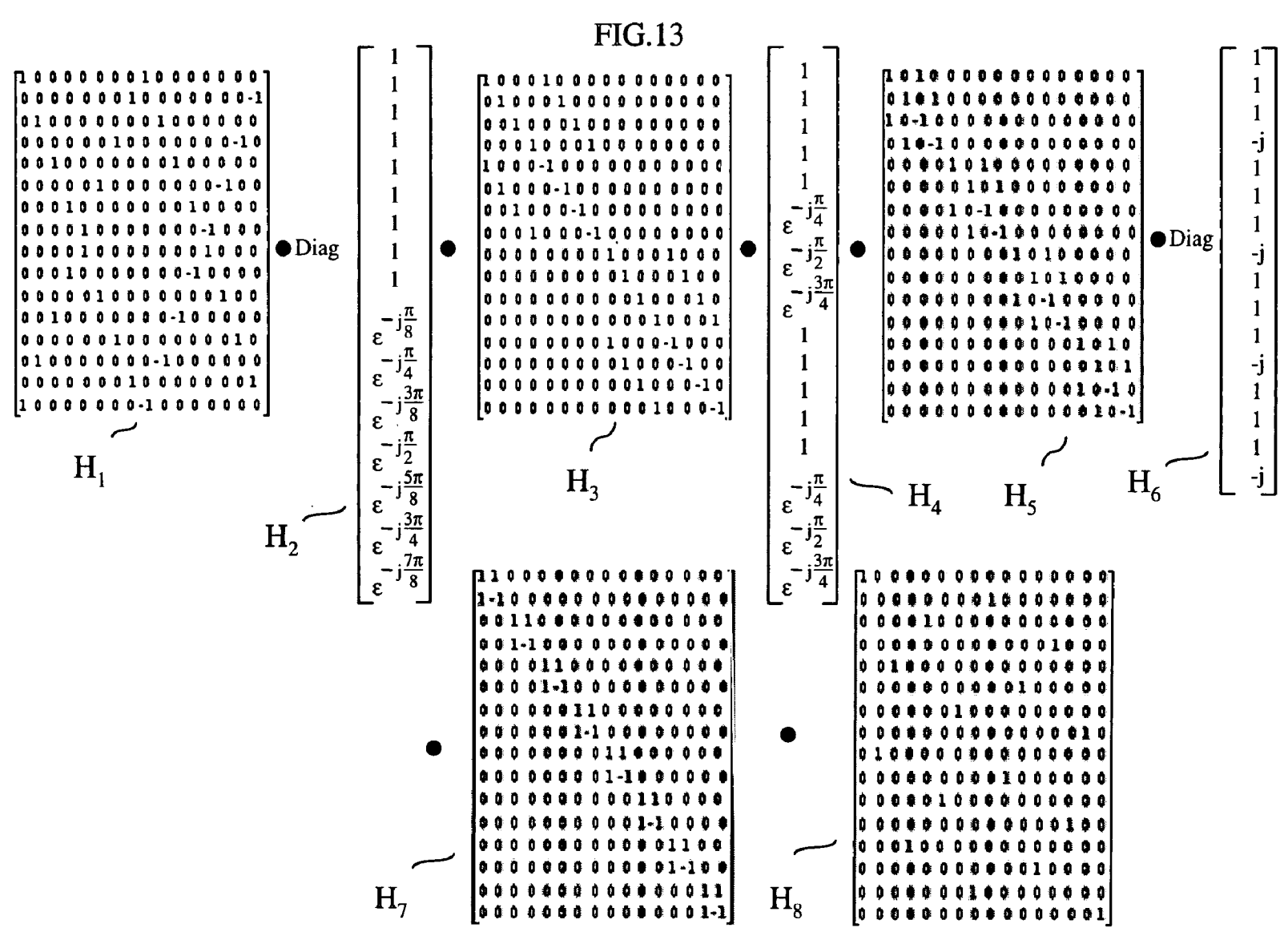

For N=16, the matrices comprising transform matrix H are further illustrated in FIG. 13. In FIG. 13, a short-hand form of notation is used with respect to matrices $H_2$, $H_4$ and $H_6$. In particular, the notation "Diag" means that the matrix is a diagonal form of matrix as known in the art, i.e., the values indicated in matrices $H_2$, $H_4$ and $H_6$ occur on the diagonal of the respective matrix and all other matrix elements have a value of zero. As can be observed from FIG. 13, matrices $H_2$ and $H_4$ include complex weighting factors, which are used to cancel the alias of undesired transponder channels and re-enforce those components corresponding to a desired transponder channel, as described earlier.

As can be further observed from FIG. 13, and in accordance with an aspect of the invention, transform matrix H is a sparse matrix factorization. As used herein, a sparse matrix refers to the predominance of zero values in each of the matrices shown in FIG. 13. This advantageously only requires 28 real multiplies and 70 real additions. Indeed, all multiplications are constants allowing multiplier-less implementation techniques (used for instance canonic signed digit and product of sums method as known in the art). As a result, transform element 230 may be illustratively implemented to perform the above-described matrix processing utilizing a field programmable gate array (FPGA). It should be noted that if fewer than 16 channels need to be simultaneously decoded, e.g., only four channels, than the matrices shown in FIG. 13 can be further pruned to reduce the number of calculations required.

Figure 14:
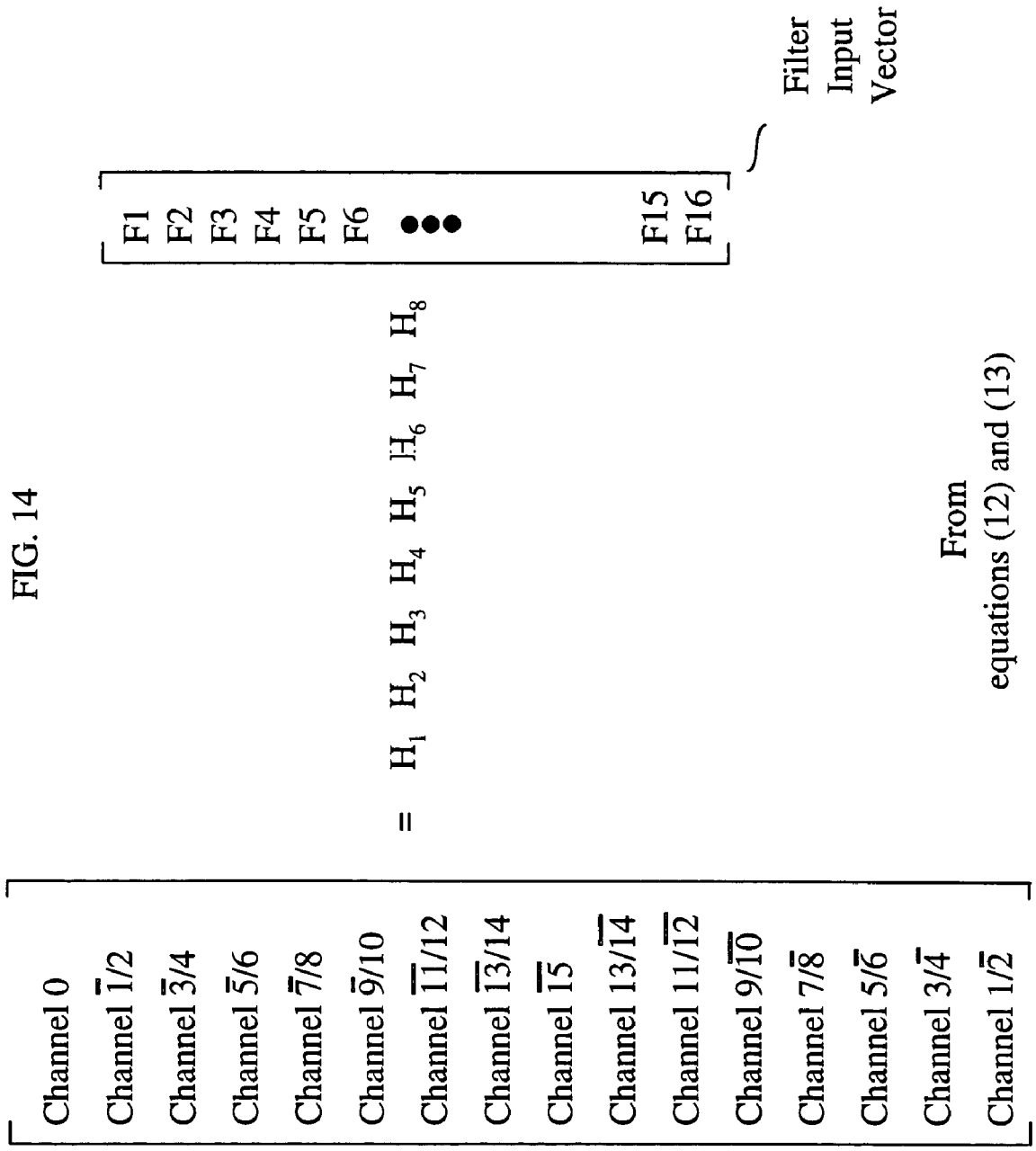
FIG. 14 is an illustrative transform operation in accordance with the principles of the invention.

In accordance with equation (12), above, an illustrative equation is shown in FIG. 14 for the above-mentioned 16 DSS channels. It should be observed that the output vector, $O_c$, shown in FIG. 14 includes a number of odd-even channel pairs that are folded into the same bandwidth, e.g., the element in row 2, column 1, is the output corresponding to transponder channel $\bar{1}$ (negative frequency) and channel 2 (positive frequency). In terms of the earlier-described example, this would relate to Fold 1H of FIG. 9. As such, the above-described channel rejectors 235 are also required for those channel pairs to recover the respective transponder channel. Although shown separately, the channel rejectors may be included as a part of transform element 230.

Figure 15:
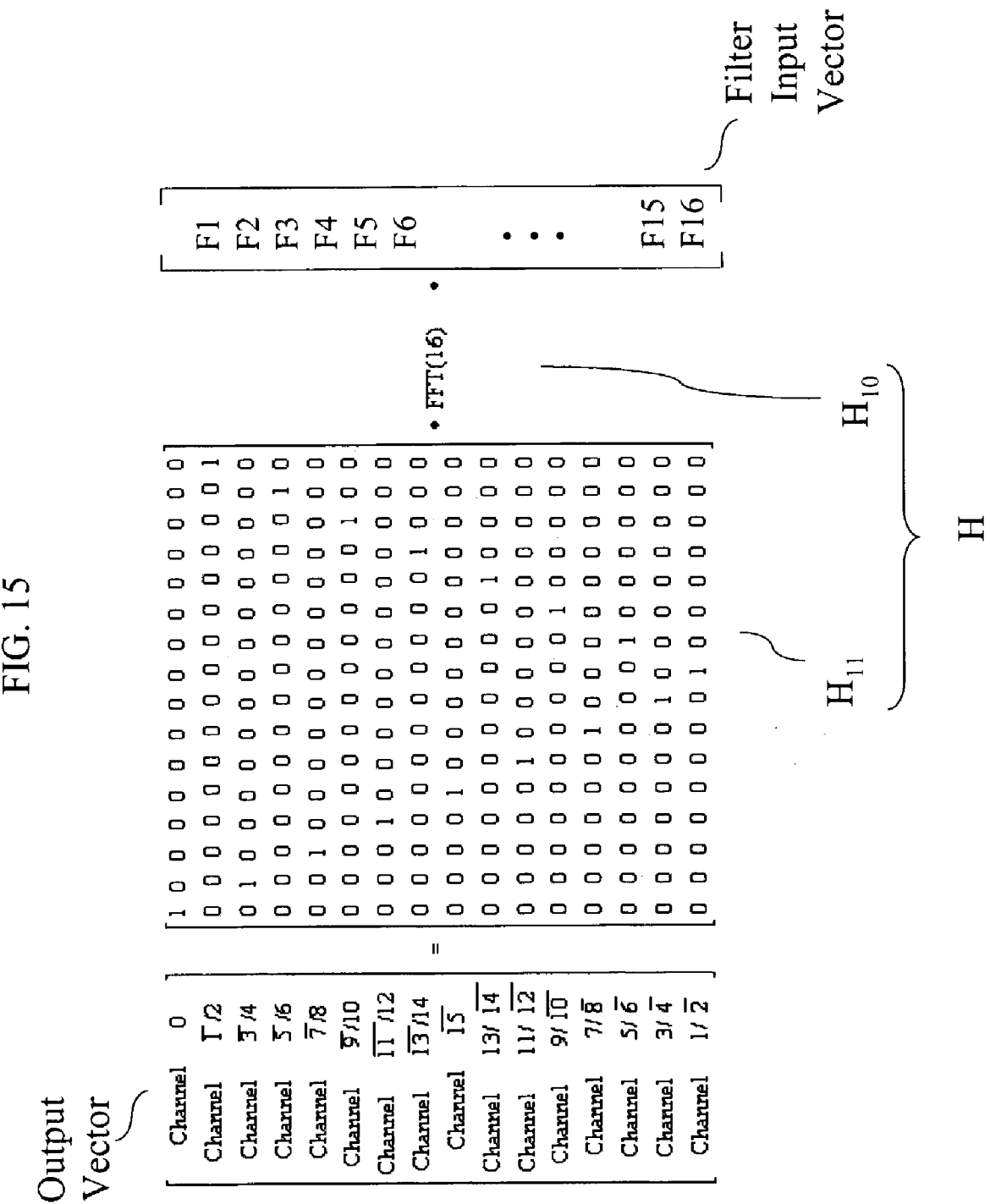
FIG. 15 is another illustrative transform operation in accordance with the principles of the invention.

It should be noted that other sparse matrix factorizations can be defined in accordance with the inventive concept. For example, utilization of a Fast Fourier Transform (FFT) algorithm can yield other sparse factorization matrices. This is illustrated in FIG. 15, which shows the following equation:

$$O_c=HF=H_{11}H_{10}F, \quad (14)$$

where, again, H is the transform matrix, F is the filter input vector and $O_c$ is the output vector, the elements of which represents each of the N transponder channels. In this example, H includes matrix $H_{11}$ as shown in FIG. 15 and $H_{10}$, where:

$$H_{10}=FFT(16). \quad (15)$$

Here, FFT(16) is an FFT matrix of order 16. Formation of an FFT matrix is known in the art. Again, it can be observed that the output vector includes odd-even channel pairs that are folding into the same bandwidth. As such, the above-described channel rejectors 235 are also required for those channel pairs to recover the respective transponder channel.

Figure 16:
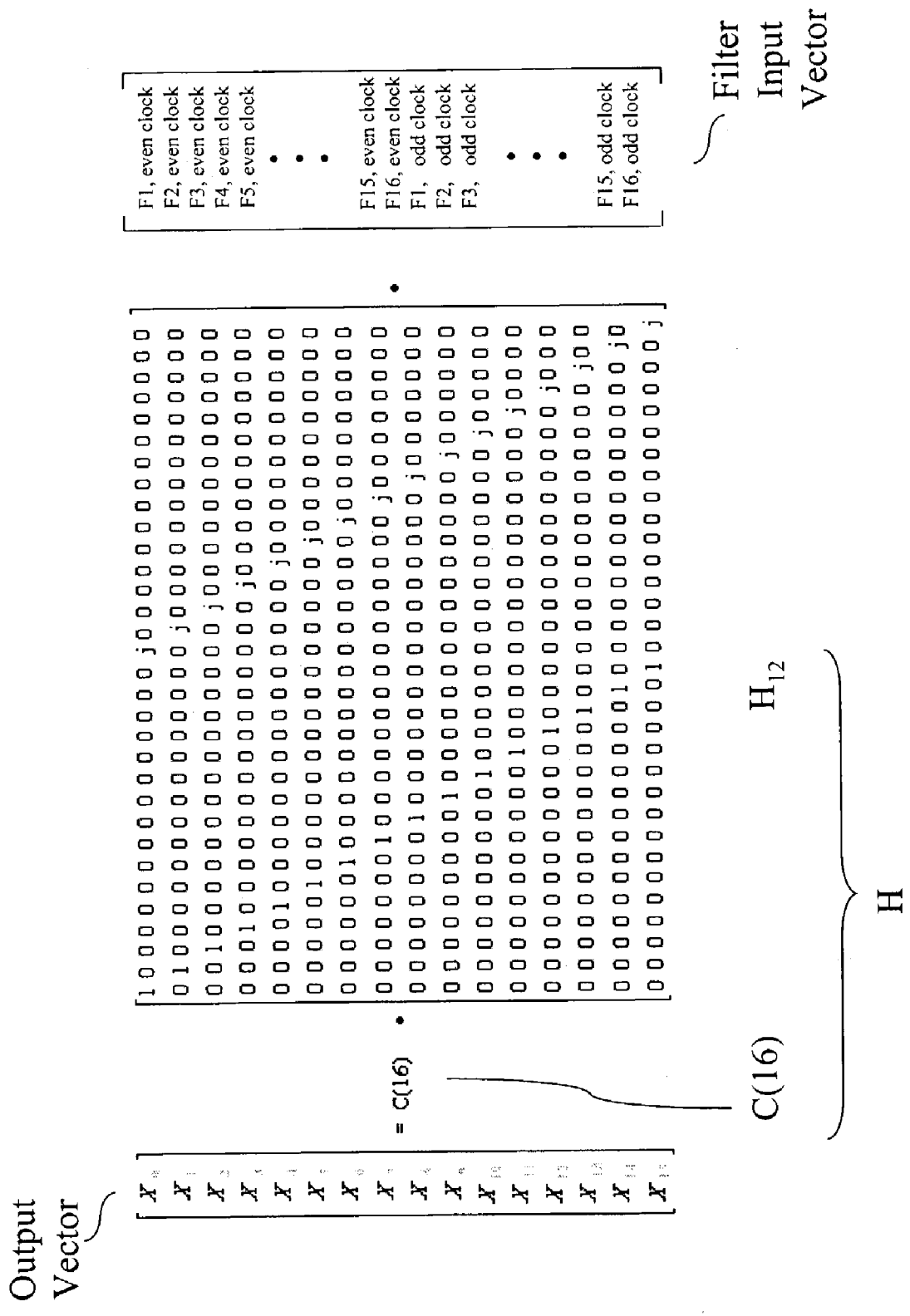
FIG. 16 is another illustrative transform operation in accordance with the principles of the invention.
Figure 17:
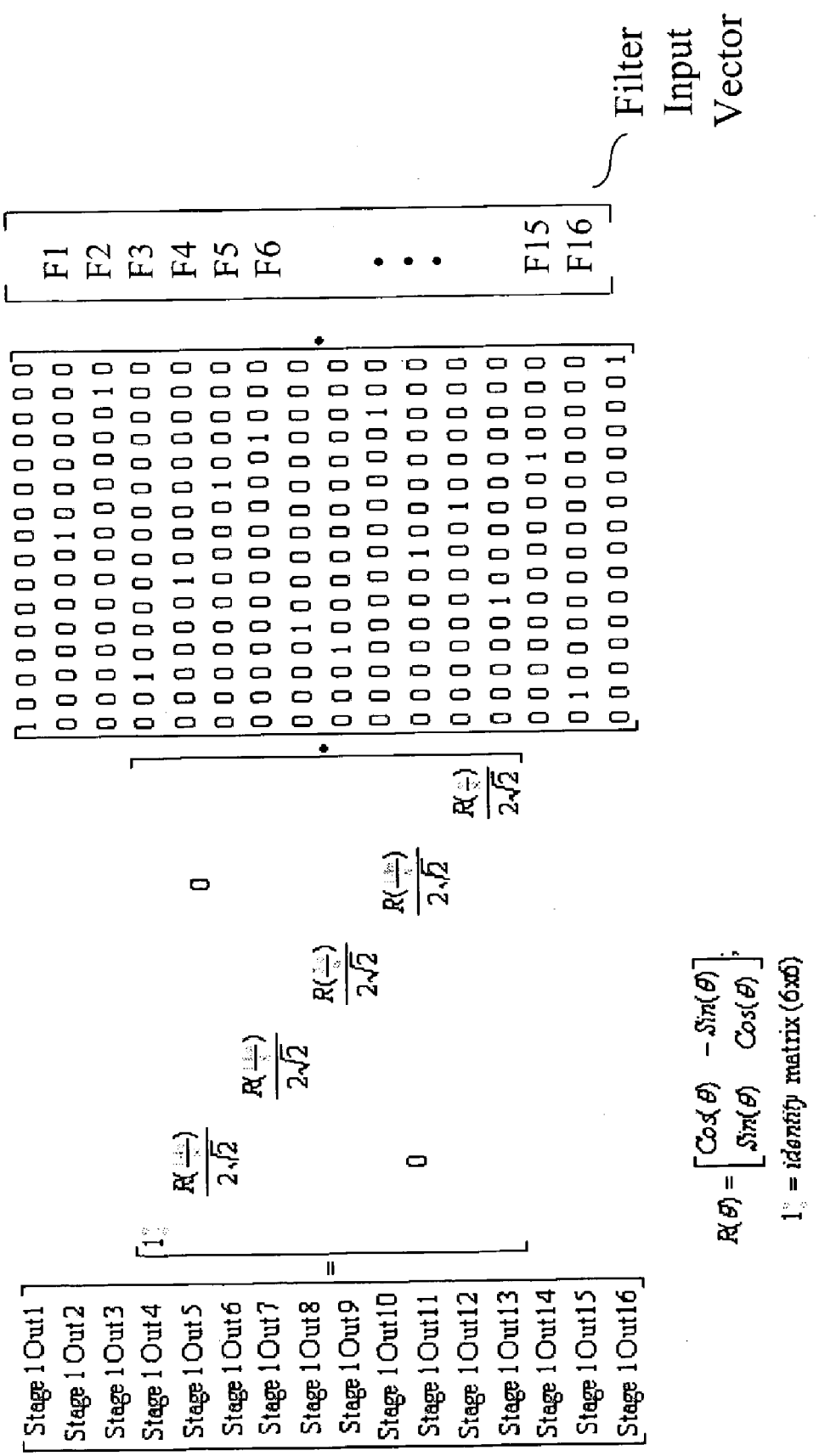

The above-described use of an FFT assumes that the element of the filter input vector are real valued. However, the use of an FFT allows an additional trade off. In particular, if all operations are implemented for complex-valued signals rather than real-valued signals, two successive filter bank outputs can be used to create a complex input (the first output is provided as the real part, while the second output is provided as the imaginary part). Equivalently, transform element 230 operates every two clock pulses. On the first clock pulse, the filter input vector is used to form the real part, while on the second clock pulse, the filter input vector is used to form the imaginery part. As such, one application of the FFT can calculate two complex output samples for each of the 16 transponder channels. While this requires more operations per FFT application, only half the FFTs per unit time are required. This results in either power savings or greater re-use of hardware resources. Such an embodiment is shown in FIG. 16, which shows the following equation:

$$X=HF=C(16)H_{12}F', \quad (16)$$

where, again, H is the transform matrix, F' is the filter input vector, but with input signals accumulated over two sample periods and X is the output vector, the elements of which represents each of the N transponder channels. In this example, H includes matrix $H_{12}$ as shown in FIG. 16 and C(16), where:

$$C(16)=H_1H_3H_5H_7H_8, \quad (17)$$

and the values of $H_1$, $H_3$, $H_5$, $H_7$ and $H_8$ are as shown in FIG. 13. It should be noted that additional processing of the output vector X is required to yield the output vector $O_c$, (shown in FIG. 15). In particular, on an even clock, $$\text{frequency channel } N = = \frac{X_N + \text{Conjugate}(X_{16-N})}{2}, \quad (18)$$

and on an odd clock:

$$\text{frequency channel } N = = \frac{X_N - \text{Conjugate}(X_{16-N})}{2}. \quad (19)$$

Again, the output vector, $O_c$, includes odd-even channel pairs that are folding into the same bandwidth. As such, the above-described channel rejectors 235 are also required for those channel pairs to recover the respective transponder channel.

One additional form of a Discrete Fourier Transform (DFT) merits note for real input (at full rate) in which all operations are real until a final derivation of the complex frequency output is accomplished. (i.e., there are no complex operations but there is a complex output signal). In this regard, another illustration of the use of a transform to cancel the alias representing undesired transponder channels and re-enforce those components corresponding to the desired transponder channel is the known Hartely-based DFT. The overall equation is shown in FIGS. 17-22. Each figure shows a separate stage of the equation. The first stage is shown on FIG. 17 and the last stage is shown on FIG. 22. This Fast Hartley Based DFT Requires 36 Multiplies and 100 Adds (16 Real Inputs to 16 Complex Outputs). It should be observed on FIGS. 17 and 20 that shorthand notations are defined for use in the various stages. For larger channel count tuners a Fast Hartley Based DFT should be more efficient than the full rate FFT-like embodiment. As before, the output vector, $O_c$, includes odd-even channel pairs that are folding into the same bandwidth. As such, the above-described channel rejectors 235 are also required for those channel pairs to recover the respective transponder channel.

Figure 23:
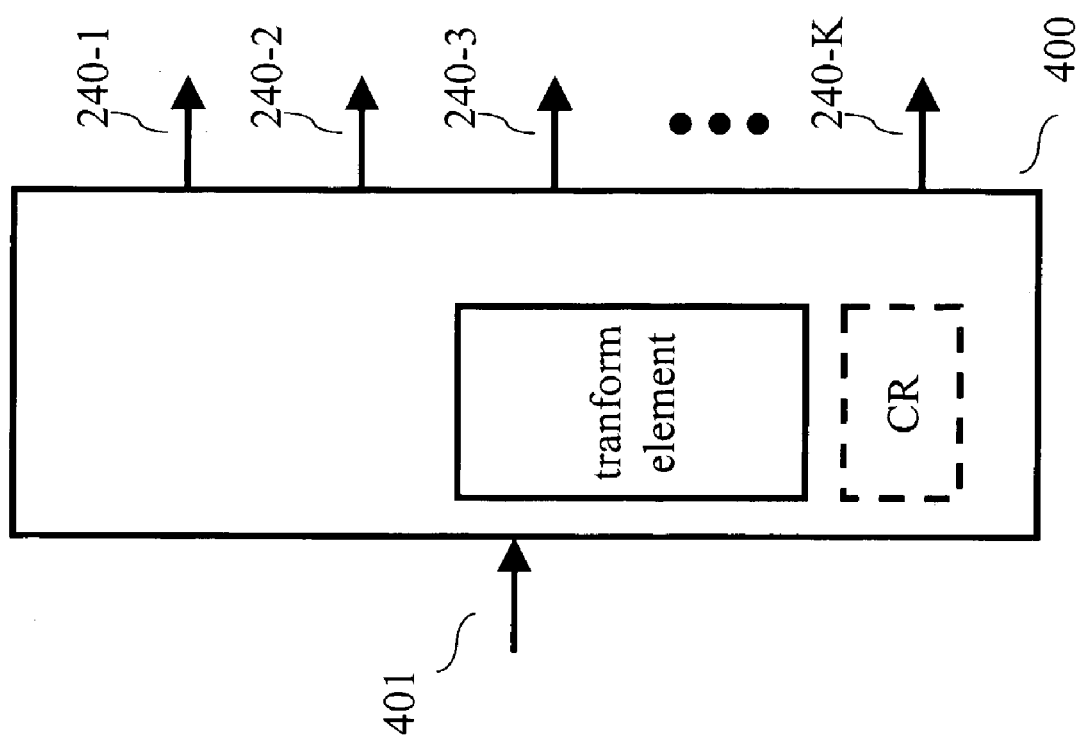
FIG. 23 shows another illustrative embodiment of the invention.

As noted above, the transform element may be implemented in an integrated circuit such as an FPGA. As such, as shown in FIG. 23, a single-chip solution is possible for simultaneously providing content from different transponder channels. Illustratively, an integrated circuit 400 may include at least a transform element 230 to provide therefrom a plurality of virtual channels 240-1 to 240-K, where at least some of the content of these virtual channels are simultaneously provided from different transponder channels. As required, the integrated circuit 400 may include channel rejectors (CR), as described above.

As described above, receiver 200 enables a plurality of frequency channels to be simultaneously tuned such that broadcast channel programs included within different frequency channels may be simultaneously accessed. In addition, and in accordance with an aspect of the invention, the amount of hardware required to implement a multi-channel cancellation tuner is simplified by use of a single computation element as represented by transform element 230.

It should be noted that other forms of LNB processing may also be used. For example, LNB 205 may perform a filtering operation to a relaxed specification with a broad transition band of width ($PF_s$) above and below the N channel band to reach acceptable stop band attenuation, where P is an integer. Moreover, the LNB may spectrally move the lowest frequency channel so that the corresponding carrier $F_0$ is equal to $[F_s/2+(PF_s)]$. With this variation, the A/D converter 210 is clocked at the sampling rate $[2(N+(2P))F_s]$, and the number of parallel paths used for signal cancellation tuning is N+(2P). The energy just outside of the N channel band that was not removed by filtering will be removed by cancellation with the same process that cancels the energy of competing channels as described above. This variation may allow LNB 205 to utilize smaller, lower performance filters, rather than physically larger and lossy SAW filters.

Similarly, LNB 205 may provide signal 206 such that the frequency of the highest frequency channel (i.e., $F_N$) is arranged to fall on an even folding frequency of a sampling rate, $F_F$. This technique may be used for those highest frequency channels that satisfy:

$$F_F = 2\left[\frac{F_N + \frac{F_S}{2}}{2NF_S}\right], \quad (20)$$

when sampling A/D 210 at $2NF_s$, or $$F_F = \left[\frac{F_N + F_S(P+.5)}{2(N+2P)F_S}\right], \quad (21)$$

when sampling A/D 210 at $[2(N+(2P))F_s]$.

Likewise, LNB 205 may provide signal 206 such that the frequency of the lowest frequency channel (i.e., $F_1$) is arranged to fall on an even folding frequency of a sampling rate, $F_F$. This technique may be used for those lowest frequency channels that satisfy:

$$F_F = 2\left[\frac{F_1 - \frac{F_S}{2}}{2NF_S}\right], \quad (22)$$

when sampling A/D 210 at $2NF_s$, or $$F_F = \left[\frac{F_1 - F_S(P+.5)}{2(N+2P)F_S}\right], \quad (23)$$

when sampling A/D 210 at $[2(N+(2P))F_s]$.

It should also be noted that constraints on the clock rate of A/D 210 can be relaxed somewhat by inclusion of a sample rate converter. The latter representing a calculated sequence derived from some sampling (uniform or non-uniform) not conforming to the desired sample spacing T.

Also, it should be noted that although the inventive concept was illustrated in the context of decimation by the number of channels, N, other decimation values can be used, e.g., 2N, etc. In this context, it may be necessary to both filter and cancel (as described herein) the decimated data streams in order to simultaneously recover transport bit streams from different transponder channels.

Further, it should be noted that although described in the context of a satellite distribution, the inventive concept is not so limited and also applies to other distribution mechanisms whether wireless and/or wired. For example, the invention is applicable to cable, terrestrial or other networks (such as broadcast and/or commercial networks).

As such, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as a separate elements, any or all of the elements of FIGS. 10 and 12 (e.g., 215 and/or 240) may be implemented in a stored-program-controlled processor. It is therefore to be understood that numerous modifications may be made to the illustrative embodiments and that other arrangements may be devised without departing from the spirit and scope of the present invention as defined by the appended claims.

The invention claimed is:

1. A receiver comprising:
   a receiver section for providing a signal having a plurality of different frequency wideband channels, each frequency wideband channel conveying a different bit stream; and
   a signal cancellation tuner operative on the signal for recovering the different bit streams from at least two of the plurality of different frequency wideband channels and for simultaneously providing the recovered different bits streams.

2. The receiver of claim 1, wherein the signal cancellation tuner comprises:
   a sampler for sampling the signal to provide a number of decimated sample streams; and
   a transform element operative on the number of decimated sample streams for providing the recovered different bit streams.

3. The receiver of claim 2, wherein the sampler includes:
   a demultiplexer for demultiplexing the signal into the number of decimated sample streams; and
   a filter bank for time-aligning the number of decimated sample streams for application to the transform element.

4. The receiver of claim 2, further comprising at least one channel recovery element for separating odd-even frequency channel pairs subsequent to transformation to provide at least some of the recovered different bit streams.

5. The receiver of claim 2, wherein the transform element performs matrix-based processing on the number of decimated sample steams using sparse matrix factorization.

6. The receiver of claim 2, wherein the transform element performs matrix-based processing on the number of decimated sample steams using a fast fourier transform.

7. The receiver of claim 2, wherein the transform element performs matrix-based processing on the number of decimated sample steams using a hartley-based discrete fourier transform.

8. The receiver of claim 1, further comprising a broadcast channel distributor for providing a number of virtual channels from the recovered different bit streams.

9. A satellite receiver comprising:
   a low-noise block for receiving a signal representing a plurality of different transponder channels and an analog-to-digital converter for providing therefrom a data signal representing a sequence of samples occurring at a sample rate greater than, or equal to, a Nyquist rate related to a total bandwidth of the plurality of different transponder channels, each transponder channel conveying a bit stream;
   a sampler for sampling the data signal for providing N decimated data streams, where N>1; and
   a transform element operative on the N decimated data streams for simultaneously providing at least two output signals representing bit streams from at least two of the plurality of different transponder channels.

10. The satellite receiver of claim 9, wherein the sampler includes:
    a demultiplexer for demultiplexing the signal into the number of decimated data streams; and
    a filter bank for time-aligning the number of decimated data streams for application to the transform element.

11. The satellite receiver of claim 9, further comprising at least one channel recovery element operative on at least one of the at least two output signals for separating odd-even transponder channel pairs for providing at least one of the bit streams.

12. The satellite receiver of claim 9, wherein the transform element performs matrix-based processing on the number of decimated data steams using sparse matrix factorization.

13. The satellite receiver of claim 9, wherein the transform element performs matrix-based processing on the number of decimated data steams using a fast fourier transform.

14. The satellite receiver of claim 9, wherein the transform element performs matrix-based processing on the number of decimated data steams using a hartley-based discrete fourier transform.

15. The satellite receiver of claim 9, further comprising a broadcast channel distributor for providing a number of virtual channels from the at least two bit streams.

16. An integrated circuit for use in a satellite receiver, which receives signals from a plurality of transponder channels, the integrated circuit comprising:
    a transform element operative on a plurality of data streams for simultaneously providing at least two signals representing bit streams from at least two of the plurality of transponder channels, each of the data streams conveying images of the plurality of transponder channels; and
    a broadcast channel distributor for providing a number of virtual channels from the at least two bit streams.

17. The integrated circuit of claim 16, further comprising at least one channel recovery element for processing at least one of the at least two signals for separating odd-even transponder channel pairs to provide at least one of the bit streams.

18. The integrated circuit of claim 16, wherein the transform element performs matrix-based processing on the plurality of data steams using sparse matrix factorization.

19. The integrated circuit of claim 16, wherein the transform element performs matrix-based processing on the plurality of data steams using a fast fourier transform.

20. The integrated circuit of claim 16, wherein the transform element performs matrix-based processing on the plurality of data steams using a hartley-based discrete fourier transform.

21. A method for use in a receiver comprising:
    providing a signal having a plurality of different frequency wideband channels, each frequency wideband channel conveying a different bit stream;
    performing signal cancellation on the signal to recover the different bit streams from at least two of the plurality of different frequency wideband channels; and
    simultaneously providing the recovered different bits streams.

22. The method of claim 21, wherein the performing step includes:
    sampling the signal to provide a number of decimated sample streams; and
    performing transform-based processing on the number of decimated sample steams for recovering the different bit streams.

23. The method of claim 22, wherein the transform-based processing step includes the step of separating odd-even frequency channel pairs for recovering at least one of the different bit streams.

24. The method of claim 22, wherein the sampling step includes:
- demultiplexing the signal into the number of decimated sample streams; and
- time-aligning the number of decimated sample streams.

25. The method of claim 22, wherein the performing transform-based processing step performs matrix-based processing on the number of decimated sample steams using sparse matrix factorization.

26. The method of claim 23, wherein the performing transform-based processing step performs matrix-based processing on the number of decimated sample steams using a fast fourier transform.

27. The method of claim 24, wherein the performing transform-based processing step performs matrix-based processing on the number of decimated sample steams using a hartley-based discrete fourier transform.

28. The method of claim 25, further comprising the step of providing a number of virtual channels from the recovered different bit streams.

* * * * *